United States Patent
Singh et al.

(10) Patent No.: US 8,769,455 B1
(45) Date of Patent: Jul. 1, 2014

(54) METHODS, SYSTEMS, AND ARTICLES OF MANUFACTURE FOR SYNCHRONOUS HIERARCHICAL IMPLEMENTATION OF ELECTRONIC CIRCUIT DESIGNS

(71) Applicant: Cadence Design Systems, Inc., San Jose, CA (US)

(72) Inventors: Sushobhit Singh, Uttar Pradesh (IN); Amit Kumar, Greater Noida UP (IN); Oleg Levitsky, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/719,058

(22) Filed: Dec. 18, 2012

(51) Int. Cl.
*G06F 17/50* (2006.01)
*G06F 9/455* (2006.01)

(52) U.S. Cl.
USPC ........... 716/108; 716/101; 716/110; 716/113; 716/118

(58) Field of Classification Search
USPC .................. 716/101, 108, 110, 113, 118
See application file for complete search history.

(56) References Cited

U.S. PATENT DOCUMENTS

2011/0022998 A1* 1/2011 Rao et al. ............... 716/108

* cited by examiner

*Primary Examiner* — Suresh Memula

(74) *Attorney, Agent, or Firm* — Vista IP Law Group, LLP

(57) ABSTRACT

Various embodiments use connectivity information or model(s), design attribute(s), and system intelligence layer(s) to make lower blocks at lower levels aware of changes made in other blocks at same or different levels to implement the design at different levels synchronously. Budgeting is performed for the design to distribute budgets to respective blocks in the design. The various budgets may be borrowed from one or more blocks and lent to a block in order for this block to meet closure requirements such that a total number of iterations of the reassembly process, which integrates lower level blocks into top level design, may be reduced or completely eliminated. The design attribute(s) or the connectivity model(s) or information is updated upon the identification of changes to provide the latest information or data for properly closing a design.

35 Claims, 15 Drawing Sheets

METHODS, SYSTEMS, AND ARTICLES OF MANUFACTURE FOR SYNCHRONOUS HIERARCHICAL IMPLEMENTATION OF ELECTRONIC CIRCUIT DESIGNS

CROSS-REFERENCE TO RELATED APPLICATION(S)

This patent application is cross related to U.S. Pat. No. 7,926,011 entitled "SYSTEM AND METHOD OF GENERATING HIERARCHICAL BLOCK-LEVEL TIMING CONSTRAINTS FROM CHIP-LEVEL TIMING CONSTRAINTS" and filed Jan. 10, 2007, the content of which is hereby expressly incorporated by reference in its entirety.

BACKGROUND

Integrated circuits, or ICs, are created by patterning a substrate and materials deposited on the substrate. The substrate is typically a semiconductor wafer. The patterned features make up devices and interconnections. This process generally starts with a designer creating an integrated circuit by hierarchically defining functional components of the circuit using a hardware description language. From this high-level functional description, a physical circuit implementation dataset is created, which is usually in the form of a netlist. This netlist identifies logic cell instances from a cell library, and describes cell-to-cell connectivity.

Many phases of these electronic design activities may be performed with computer aided design (CAD) tools or electronic design automation (EDA) systems. For example, an integrated circuit designer may use a set of layout EDA application programs, such as a layout editor, to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters. The EDA layout editing tools are often performed interactively so that the designer can review and provide careful control over the details of the electronic design.

Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist. The task of all routers is the same—routers are given some pre-existing polygons consisting of pins on cells and optionally some pre-routes from the placers to create geometries so that all pins assigned to different nets are connected by wires and vias, that all wires and vias assigned to different nets do not overlap, and that all design rules are obeyed. That is, a router fails when two pins on the same net that should be connected are open, when two pins on two different nets that should remain open are shorted, or when some design rules are violated during routing.

Timing closure has become increasingly difficult and presents some profound challenges in electronic circuit designs. The main goal of computer-aided design simulations is obtaining desired device electrical characteristics. Nonetheless, geometric dimensions and profiles of features of an electronic circuit design often have significant impact on the device electrical characteristics. The device dimensions which may have significant impact on the electrical characteristics include, for example, gate oxide thickness, gate width and length, shape of the poly gate at the bottom, and spacer width. As device geometry shrinks, semiconductor fabrication processes require more complex techniques to meet the design goals such as lower power supply, thinner gate oxides, shorter channel length, higher body doping concentration, and thinner silicon films. More importantly, the timing delay caused by the wires becomes more significant and can no longer be ignored.

As the device size continues to shrink and the clock frequency nevertheless increases, particularly into the deep-submicron regime, the electrical properties of wires or conductors become more prominent, and integrated circuit chips are more susceptible to breakdowns during fabrication due to, for example, the antenna effect or due to wear out or degradation over time due to, for example, electro-migration. Some prior methods propose prioritizing the nets and forcing shorter wire lengths among the high-priority, timing critical nets. However, making certain wires shorter usually comes at the expense of making other wires longer. Some other prior methods use larger gates with bigger transistors and higher drive strengths to charge the capacitance of wires more quickly and therefore making the path faster to maintain timing correctness without overly shortening some wires while lengthening others. However, there exists one problem for these methods. In electronic designs, the actual wire lengths are usually not known until some gates are physically in place occupying certain area(s) in the electronic circuit. Nonetheless, because larger gates also have larger capacitance and thus increases power and perhaps timing delay, the above method does not satisfactorily solve the problems caused by increasingly shrinking feature sizes.

Moreover, the continual effort to scale down electronic design features to the deep submicron region requires multilevel interconnection architecture to minimize the timing delay due to parasitic resistance and capacitance. As the devices shrinks to smaller sizes, the delay caused by the increased R-C time constant becomes more significant over the delay caused by the actual wire length. In order to reduce the R-C time constant, interconnect materials with lower resistivity and interlayer films with lower capacitance are required. However, the use of low-k dielectric material also aggravates the electro-migration problem due to the poor thermal conductivity of these low-k dielectric materials.

In addition, modern electronic designs are often implemented with multiple hierarchical levels. For a hierarchical electronic design, accurate timing analyses are very important. For faster convergence of the entire chip implementation, reassembly is typically used to iteratively perform block level timing constraints with hierarchical partitioning and time budgeting and block reassembly to synchronize changes made at the block level, until a good flat chip timing is achieved. Nonetheless, the reassembly flow requires expensive iterations, each of which requires full chip assembly and timing assessment. The reassembly flow may also lead to degraded post assembly timing and hence longer time to market.

In addition, in a typical reassembly flow, each block in the chip implementation is implemented independent of the changes, such as transformations for timing optimization or changes in timing constraints, made in other blocks. For interface paths, the assigned budget for block implementation may get exhausted with a given reference clock before the interface paths are properly closed and thus leaving no room for further optimization. As a result, this conventional approach may have to go through the expensive reassembly cycles with re-budgeting. In some cases, an interface path may be made a multi-cycle path from a single-cycle path or vice-versa during the independent implementation of a block such that the distributed budgets are rendered defunct because the original budgets usually lead to highly optimistic or highly pessimistic timing due to the increased or reduced cycles on the interface path. Moreover, if an interface is made a false path then its chip top level representation also becomes a false path. Nonetheless, this information is communicated to other blocks only after reassembly due to the independent implementation of the blocks and thus may lead to non-useful area claimed.

Thus, there exists a need for a method, a system, and an article of manufacture for synchronous hierarchical implementation of electronic circuit designs.

SUMMARY

Disclosed are method(s), system(s), and article(s) of manufacture for synchronous hierarchical implementation of electronic circuit designs in one or more embodiments. Various embodiments reduce the expensive reassembly iterations, which integrate lower hierarchical level blocks into the top level design, by synchronizing the block and the top level implementation, rather than implementing the blocks and the top level independently, without having knowledge of changes that occur in one but not others. Various embodiments implement the block level and top level of a hierarchical electronic design synchronously by using at least the connectivity information or model, one or more system intelligence layers, or one or more design attributes. Some embodiments implement the block level(s) and top level of the hierarchical electronic design in parallel, while communicating information about changes in one block to other blocks and the top level.

Each block as well as the top level may thus be properly closed individually while reducing or complete eliminating the total number of iterations of the reassembly flow in some embodiments. Various embodiments identify changes and use the connectivity information or models to determine the extent that these identified changes need to be propagated and update the information and data related to the hierarchical electronic design based at least in part upon the propagated changes, regardless of the hierarchical levels on which the changes occur. Various embodiments also perform budgeting and re-budgeting accordingly and properly close block designs at lower hierarchical levels by borrowing and lending budgets among blocks at the same hierarchical levels or different hierarchical levels based at least in part upon the connectivity information or models unless or until no more borrowing or lending is possible, given a current set of constraints for one or more blocks. The re-budgeting enables various embodiments to close at least some of the blocks at lower hierarchical levels without having to resort to the reassembly iterations.

Disclosed are method(s), system(s), and article(s) of manufacture for synchronous hierarchical implementation of electronic circuit designs. In some embodiments, the method may comprise the process of identifying a hierarchical electronic design comprising at least a higher hierarchical level that includes at least a first block, determining whether the higher hierarchical level of the hierarchical electronic design meets an objective, implementing the higher hierarchical level and the first block of the hierarchical electronic design, and reducing a number of iterations of a reassembly process that integrates one or more blocks situated at one or more lower hierarchical levels into the higher hierarchical level of the hierarchical electronic design by using a connectivity and attribute model. In some embodiments, the method may further comprise the process of performing closure for the higher hierarchical level without requiring to perform the reassembly process to integrate one of the first block or a second block that is situated within the higher hierarchical level into the higher hierarchical level, or performing the reassembly process to integrate a block situated at the one or more lower hierarchical levels into the higher hierarchical level with reduced number of iterations in the reassembly process.

In some embodiments, the act of implementing the higher hierarchical level and the first block of the hierarchical electronic design comprises partitioning the higher hierarchical level of the hierarchical electronic design into multiple partitions, performing budgeting for each of the multiple partitions in the higher hierarchical level, and at least one of generating one or more first design attributes for the connectivity and attribute model for at least one partition of the multiple partitions based at least in part upon a result of the budgeting, and modifying one or more preexisting design attributes in the connectivity and attribute model. In some embodiments, the act of reducing the number of iterations of the reassembly process comprises identifying a connectivity layer from the connectivity and attribute model, interfacing the connectivity model with one or more attributes by using a system intelligence layer, identifying a request to update at least one attribute of the one or more attributes, identifying an affected component that will be affected by the request by using at least the connectivity layer, and updating one or more associated attributes of the affected component by using the system intelligence layer.

In some embodiments, the method may further comprise the processes of identifying a second block that is situated on a same or different hierarchical level than the first block, identifying a first budget distributed to the first block from a result of performing the budgeting, lending a part of a second budget of the second block to the first block, imposing a second additional constraint on the second block based at least in part upon the part of the second budget lent, and determining whether or not the first block meets a first part of the objective based by using at least the part of the second budget of the second block. In some embodiments, the method may comprise the processes of borrowing a part of the first budget of the first block to re-distribute the part to the second block, imposing a first additional constraint on the first block based at least in part upon the part of the first budget borrowed, and determining whether or not the second block meets a first part of the objective based by using at least the part of the first budget of the first block.

In some embodiments, the method may comprise the process of identifying a hierarchical electronic design comprising at least a higher hierarchical level that includes at least a first block, determining whether the higher hierarchical level of the hierarchical electronic design meets an objective based at least in part upon a budgeting result, implementing the higher hierarchical level and the first block of the hierarchical electronic design, and determining whether or not re-budgeting is to be performed by using at least a system intelligence layer. In some embodiments, act of implementing the higher hierarchical level and the first block of the hierarchical electronic design may comprises the process of partitioning the higher hierarchical level of the hierarchical electronic design into multiple partitions. In some embodiments, the act of implementing the higher hierarchical level and the first block of the hierarchical electronic design further comprising at least one of generating one or more first design attributes for the connectivity and attribute model for at least one partition of the multiple partitions based at least in part upon a result of the budgeting, and modifying one or more preexisting design attributes in the connectivity and attribute model.

In some embodiments, the act of determining whether or not re-budgeting is to be performed may further comprise identifying a first budget distributed to the first block, identifying a second block and a second budget distributed to the second block, wherein the second block is situated at a same or different hierarchical level than the first block, and lending an amount of the first budget to a second block to update the second budget based at least in part upon the amount of the first budget by using the system intelligence layer based at least in part upon a value of a design attribute. In some embodiments, the act of determining whether or not re-budgeting is to be performed may further comprise adding one or more additional constraints or modifying one or more existing constraints for the first block, and determining whether or not the second block meets a respective objective that corresponds to the objective.

In some embodiments, the act of determining whether or not re-budgeting is to be performed may comprise identifying a change in a path exception in the hierarchical electronic design by using at least the system intelligence layer, and determining whether or not the change in the path exception affects one or more required times by using at least the system intelligence layer. In some embodiments, the act of determining whether or not re-budgeting is to be performed may further comprise the processes of identifying a required time that is affected by the change in the path exception, adjusting the required time based at least in part upon the change in the path exception, and redistributing one or more budgets based at least in part upon the required time that is adjusted. In some embodiments, the method may further comprise the processes of revising one or more design attributes based at least in part upon the one or more budgets that are redistributed, loading the one or more design attributes, which are revised, for implementing the higher hierarchical level and the first block of the hierarchical electronic design, and performing closure for the higher hierarchical level based at least in part upon the one or more design attributes that are revised.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to a methods, systems, and articles of manufacture for implementing multi-layer local maximal routing paths. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are method(s), system(s), and article(s) of manufacture for synchronous hierarchical implementation of electronic circuit designs in one or more embodiments.

Various Embodiments

Figure 1:
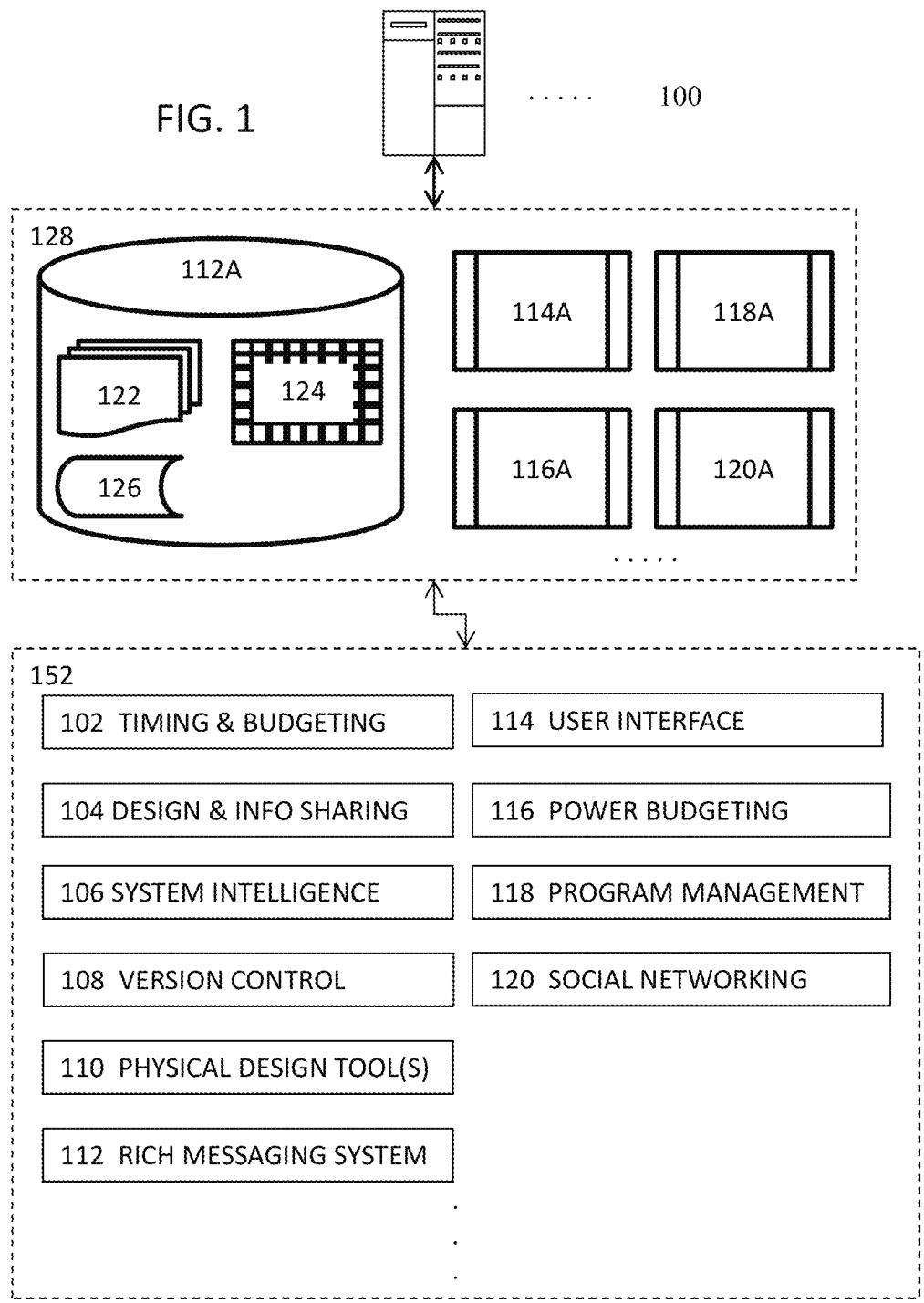
FIG. 1 illustrates a high level block diagram for a system for synchronous hierarchical implementation of electronic circuit designs in some embodiments.

FIG. 1 illustrates a high level block diagram for a method or a system for generating multi-layer local maximally spanning routing paths in a fractured space in some embodiments. In one or more embodiments, the system for generating multi-layer local maximally spanning routing paths in a fractured space may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access various resources 128 that may comprise a global routing engine and/or a detail routing engine 114A, a layout editor 116A, a design rule checker 118A, a verification engine 120A, etc. The one or more computing systems 100 may further write to and read from a local or remote volatile or non-volatile computer accessible storage 112A that stores thereupon data or information such as, but not limited to, one or more databases (124) such as schematic design database(s) or physical design database(s), libraries, data, rule decks, constraints, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof 152 that may comprises one or more of a timing and budgeting module 102 to perform various timing analyses or budgeting or a design and information sharing module 104 to share various data or information among various parts of the computing system 100 or among various parts of the electronic design under consideration, a system intelligence module 106, a version control modules 108 to provide versioning control for the electronic design under consideration, layout or physical design tool(s) 110, a rich messaging system 112 to pass various messages among various parts of the computing system 100 or among various parts (e.g., among different hierarchical levels, among different blocks at the same hierarchical level, etc.) to have hierarchy-aware block implementation. Typical functions performed by the version control module 108 may include, for example but not limited to, checking in or out of a particular version of a design, tracking version history, validating one or more aspects of the design against a particular version, validating one or more aspects against the current version.

For example, a designer may use the version control module to perform segment based validation where the method or system checks whether a segment that may be affected by a change in the design meets the associated constraints or requirements. For example, a designer may use the version control module to perform arc-based complete determination where all the parameters across all blocks may be checked according to some business intelligence. For example, a designer may use the version control module to perform full chip validation. Typical messages passed via the rich messaging module 112 may include, for example, a request for initiation of a task, approval of requests or workflows, some generic health reports for at least a part of the electronic circuit design under consideration, validation results, request(s) for resource(s), resource request approvals, or resource request rejections. The rich messaging module 112 may also embed TooRLs (e.g., a Uniform Resource Locator (URL), a Uniform Resource Identifier (URI), a hyperlink, an XLink, a wikilink, a Web address, a link, or any reference to data or information that the recipient of the message may follow or that may be followed directly) within a message that, when clicked upon, invokes the appropriate module(s) of the system to provide information that the sender of the message shared. Unless otherwise specifically claimed or described, various forms of the embedded TooRLs are collectively referred to as "a link" or "links".

In some embodiments, the one or more computing systems 100 may further interact with a user interface 114 to represent various parts of the design to a user, a power budgeting module 116 to perform power budgeting or power planning for an electronic design, a program management module 118 for calendaring or management of action items, tasks, etc., or a social networking module 120 to provide a platform for design specific discussions, pings, status updates, or information sharing, etc.

Figure 2:
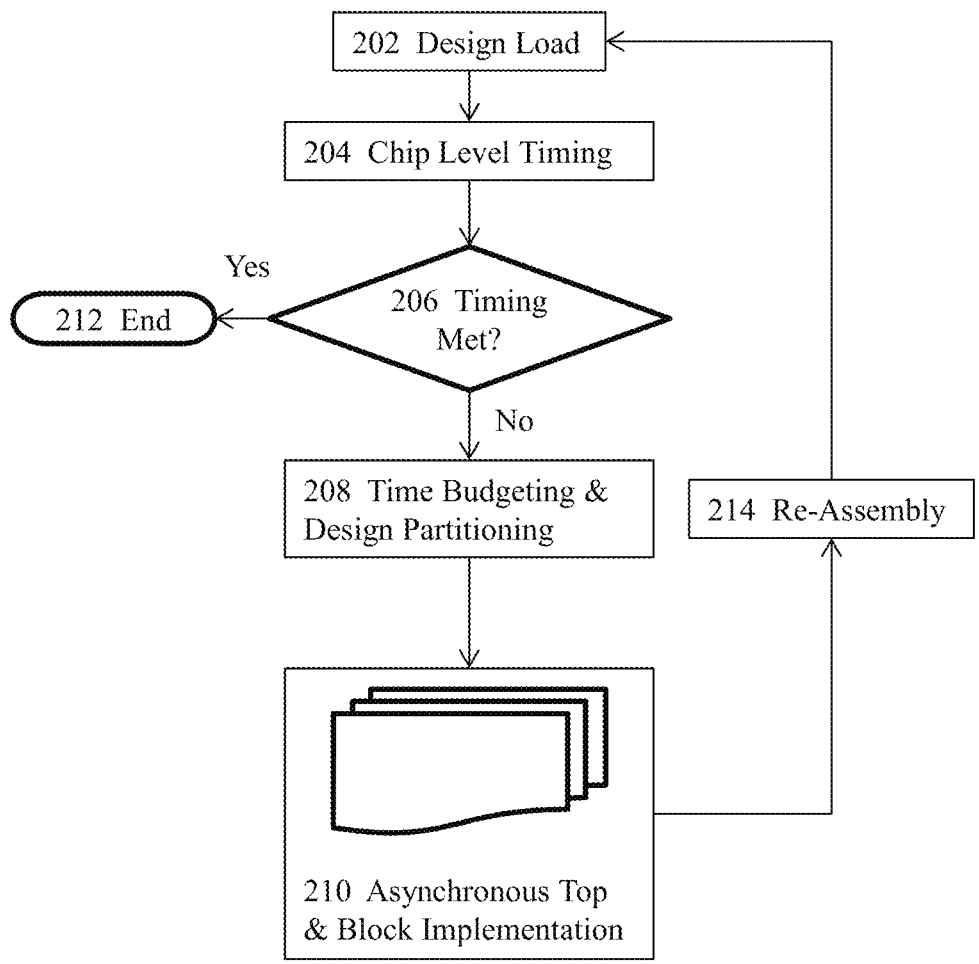
FIG. 2 illustrates a top level flow diagram for a reassembly flow for an asynchronous hierarchical implementation of electronic circuit designs in some embodiments.

FIG. 2 illustrates a top level flow diagram for a reassembly flow for an asynchronous hierarchical implementation of a hierarchical electronic circuit design in some embodiments. In some embodiments, the reassembly flow loads a design at 202 and initiates the chip level timing analyses or closure at 204. At 206, the reassembly flow may determine whether timing is properly closed at the chip level, which represents the highest hierarchical level of the hierarchical electronic circuit design. If the reassembly flow determines that timing is properly closed at 206, the reassembly flow proceeds to 212 to end to entire timing closure process. If the reassembly flow determines that timing has not been properly closed at 206, the reassembly flow may proceed to 208 to perform design partitioning, which divides the hierarchical electronic design into multiple partitions, and time budgeting to determine budgets for each of the multiple partitions, each of which may include a plurality of blocks.

At 210, the reassembly flow performs the asynchronous top level implementation where the blocks are replaced by their equivalent timing models and the block level implementation for each block. In this reassembly flow, each block is independently implemented such that a change made in the first block is not communicated to the other blocks, regardless of whether or not the first block is interconnected with at least some of the other blocks, until all the individual blocks are assembled in the top level. That is, in the reassembly flow shown in FIG. 2, the changes made in an individual block are not made known to any other blocks until all the individual blocks are assembled in the top level implementation of the hierarchical electronic design.

At 214, the reassembly flow assembles the independent implementation of each block into the top level implementation and loops back to 202 to load the design to perform the chip level timing analyses or timing closure. The reassembly flow illustrated in FIG. 2 iteratively repeats this process until the timing goals or the timing closure is finally achieved at 206. The reassembly flow shown in FIG. 2 may need load time, partitioning, budgeting, circuit implementation at various levels of the hierarchical electronic design, or time for timing analyses or timing closure for each iteration. Moreover, the asynchronous top level implementation and block level implementation may lead to post-assembly timing failures if IO (Input/Output) budgets are not properly assigned. As a result, pessimistic IO budgets are usually assigned to prevent post-assembly timing failure. Nonetheless, pessimistic IO budgets often leads to increased number of iterations during timing closure.

Figure 3:
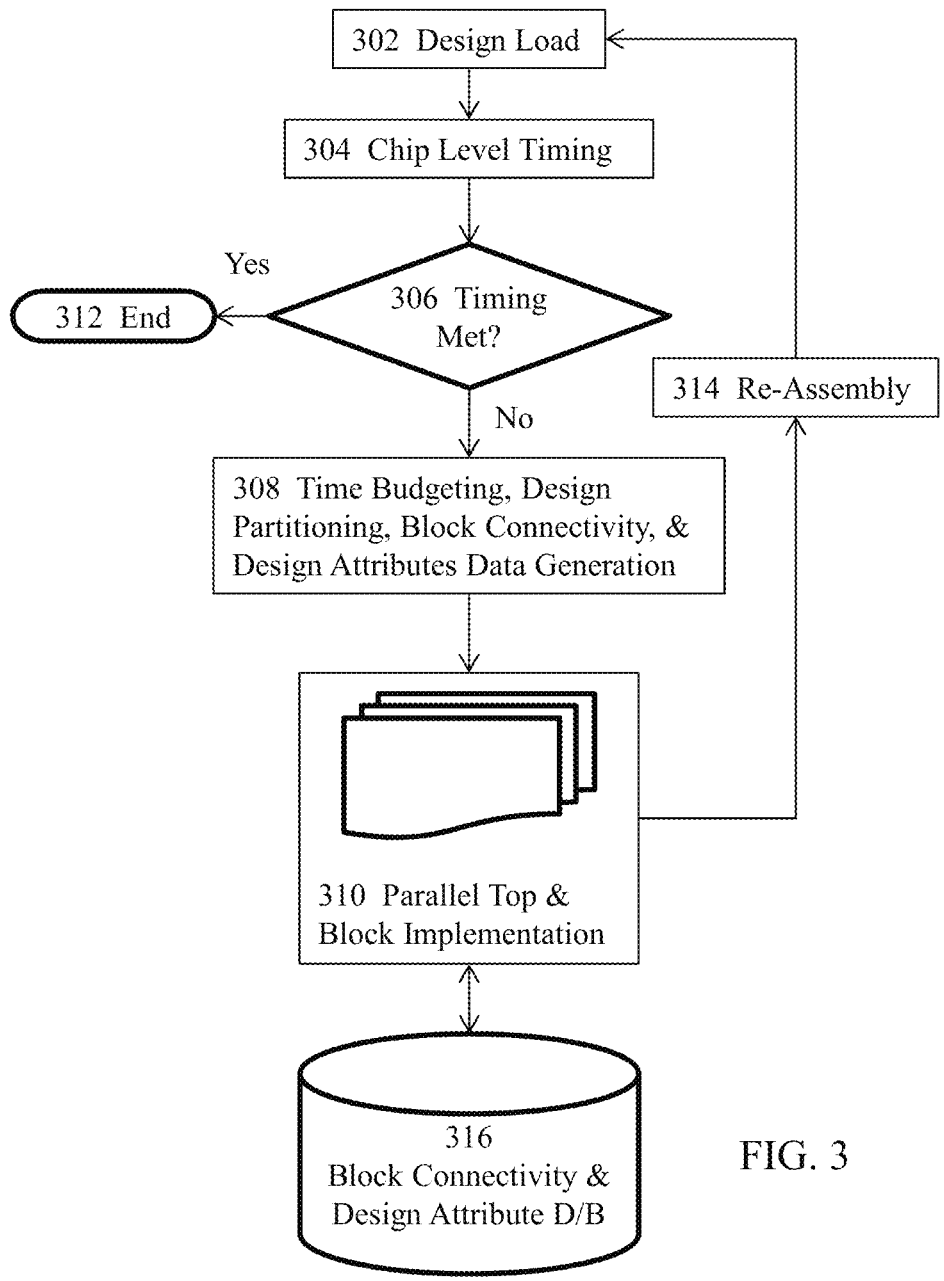
FIG. 3 illustrates a more detailed flow diagram for a reduced reassembly iteration flow for a hierarchical implementation of electronic circuit designs in some embodiments.

FIG. 3 illustrates a high level flow diagram for a reduced reassembly iteration flow for a hierarchical implementation of electronic circuit designs in some embodiments. More particularly, FIG. 3 illustrates an improved reassembly flow that keeps the block implementations of various blocks in a hierarchical electronic design synchronized by sharing various design parameters or information among various blocks in the hierarchical electronic design by using a global structure—the connectivity and design attribute database 316. The connectivity and design attribute database 316 will be described in greater details with reference to FIG. 4. In some embodiments, the process illustrated in FIG. 3 loads the design at 302 and performs top level (e.g., chip level) timing analyses or timing closure at 304. For example, the process illustrated in FIG. 3 may budget I/O timing for the partitions and create the corresponding timing models. The process may further perform physical implementation of the partitions and/or the remainder of the chip and perform timing iterations from a first point in time to a second point in time with the partitioning timing models at the top level of the hierarchy to refine the design to have better accuracy and correlation among the partition timings at the top hierarchical level until timing on each of the partitions and the top level are closed.

At 306, the process determines whether or not timing goals or timing closure is achieved. If it is determined that the timing goals or timing closure is achieved at 306, the process proceeds to 312 to close timing. If it is determined that timing closure is not properly achieved at 306, the process proceeds to 308 to partition the hierarchical electronic design into a set of partitions each having one or more blocks, perform time budgeting with the set of partitions, and generate data or information that comprises, for example but not limited to, block connectivity, one or more design attributes, etc. for each partition. The process may then perform top and block implementation for each block at 310 by receiving connectivity data for each block and design attributes from the database 316. In some embodiments, the process performs the top level and block implementation in parallel so as to reduce the time required for convergence.

The connectivity and design attribute database 316 may be a global database including the connectivity information and design database for various parts of the hierarchical electronic design at various hierarchical levels. Existing information or data in the connectivity and design attribute database may be modified, and new information or data may also be added to the connectivity and design attribute database 316. By storing the connectivity and design attributes in the database 316, each block implementation may gain at least some visibility of the implementations of other block(s). In some cases where the process performs the top level and block implementations in parallel so as to shorten the amount of time to achieve timing closure, connected blocks may share connectivity and design attributes via the use of the connectivity and design attribute database 316. The connectivity and design attribute database 316 will be described in greater details with reference to FIG. 4.

The process still needs to proceed to reassemble each block implementation at the top level, load the design at 302, and perform top level timing closure or analyses at 304 to determine whether timing goal or closure is achieved at 306 in some embodiments. In other words, the process may still need to iteratively proceed through the steps 302-314 until timing closure is achieved, although the number of iterations may be reduced because each block implementation is not independently carried out without any visibility of the implementations of other blocks as that in the flow shown in FIG. 2. Rather, the sharing of various information and data (e.g., connectivity or design attributes) through the use of the connectivity and design attribute database 316 provide some visibility of other blocks to a block implementation. Therefore, the time budgeting may be less pessimistic, and the number of iterations for the reassembly flow may thus be reduced. With the flow illustrated in FIG. 3, the method or the system for synchronous hierarchical implementation does not have to go through the re-assembly flow after each block implementation. Rather, the method or system tries to borrow or lend budget(s) across the hierarchies.

Figure 4:
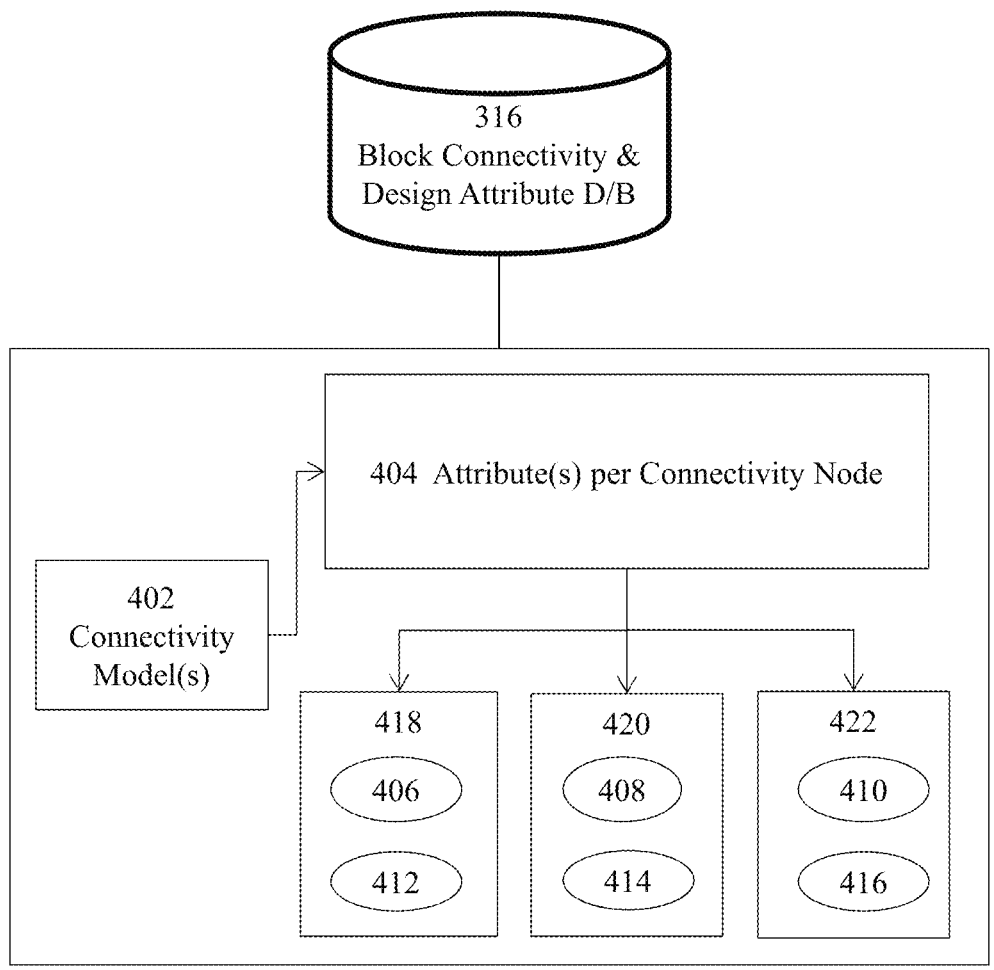
FIG. 4 illustrates more details about the connectivity and design attribute database that includes a connectivity model together with the system intelligence layer and design attributes in some embodiments.

FIG. 4 illustrates more details about the connectivity and design attribute database that includes a connectivity model together with the system intelligence layer and design attributes in some embodiments. More particularly, the connectivity and design attribute database 316 may include one or more design connectivity models 402 at various granularity levels (e.g., gate level, cell level, block level, etc.) in some embodiments. A design connectivity model comprises a carrier structure for information that may be propagated through various parts of the hierarchical electronic design in some embodiments. A design connectivity model may also be net-based and include connectivity information of one or more nets in some embodiments. The one or more connectivity models interact with one or more attributes (e.g., 418, 420, and 422) that are attributed to each connectivity node (404). The connectivity and design attribute database that includes a connectivity model together with the system intelligence layer and design attributes will be described in greater details in subsequent paragraphs with reference to FIG. 5.

A design attribute may be used to model the current state of a part of the hierarchical electronic design. Design attributes may include, for example but not limited to, IO budgets on each port, port-to-port segment delays, path exceptions through port(s), etc. For each connectivity node or block in the hierarchical electronic design, specific attribute values (406, 408, and 410) are stored in the connectivity and design attribute database 316. Some exemplary attributes include, for example but not limited to, timing budgets for blocks, etc. In some embodiments, some design attributes may change dynamically as the timing analysis or closure of the hierarchical electronic design converges. As a result, a change in an attribute may lead to one or more changes in the attribute(s) of connected port(s).

For example, a change in segment delay due to the implementation process may lead to corresponding changes in IO budgets that are dependent on segment delays. Also, any borrowing or lending of budgets across a port may lead to change in budget(s), and thus updates may also be required. Furthermore, a new exception applied at the block level may be propagated to one or more other ports, and thus budgets may need to be updated accordingly. Therefore, each attribute may be associated with a system intelligence layer (e.g., 412, 414, and 416) to handle a change to the corresponding attribute that may trigger an event of one or more changes across a part of the hierarchical electronic circuit design. The connectivity and design attribute database that includes a connectivity model together with the system intelligence layer and design attributes will be described in greater details in subsequent paragraphs with reference to FIG. 5.

Figure 5:
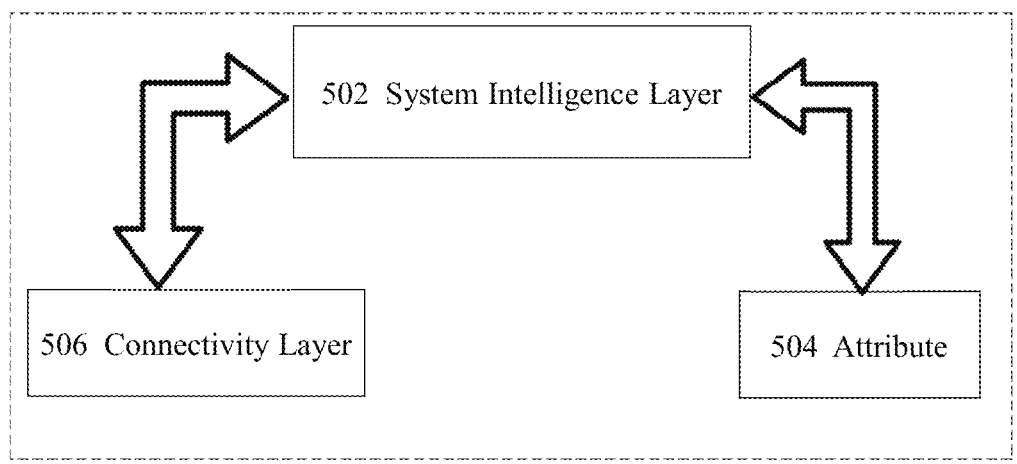
FIG. 5 illustrates the interaction of the system intelligence layer with the connectivity layer and the attributes in the connectivity and design attribute database in some embodiments.

FIG. 5 illustrates the interaction of the system intelligence layer with the connectivity layer and the attributes in the connectivity and design attribute database in some embodiments. In this exemplary implementation, a system intelligence layer or model 502 may interact with both the connectivity layer or model 506 and the attribute 504 with which the system intelligence layer 502 is associated. Upon receiving an attribute update request, the system intelligence layer 502 communicates with the connectivity layer or model 506 to obtain the nodes that may be affected by updating the attribute and to update the associated attribute 504 to satisfy the attribute update request.

Figure 6:
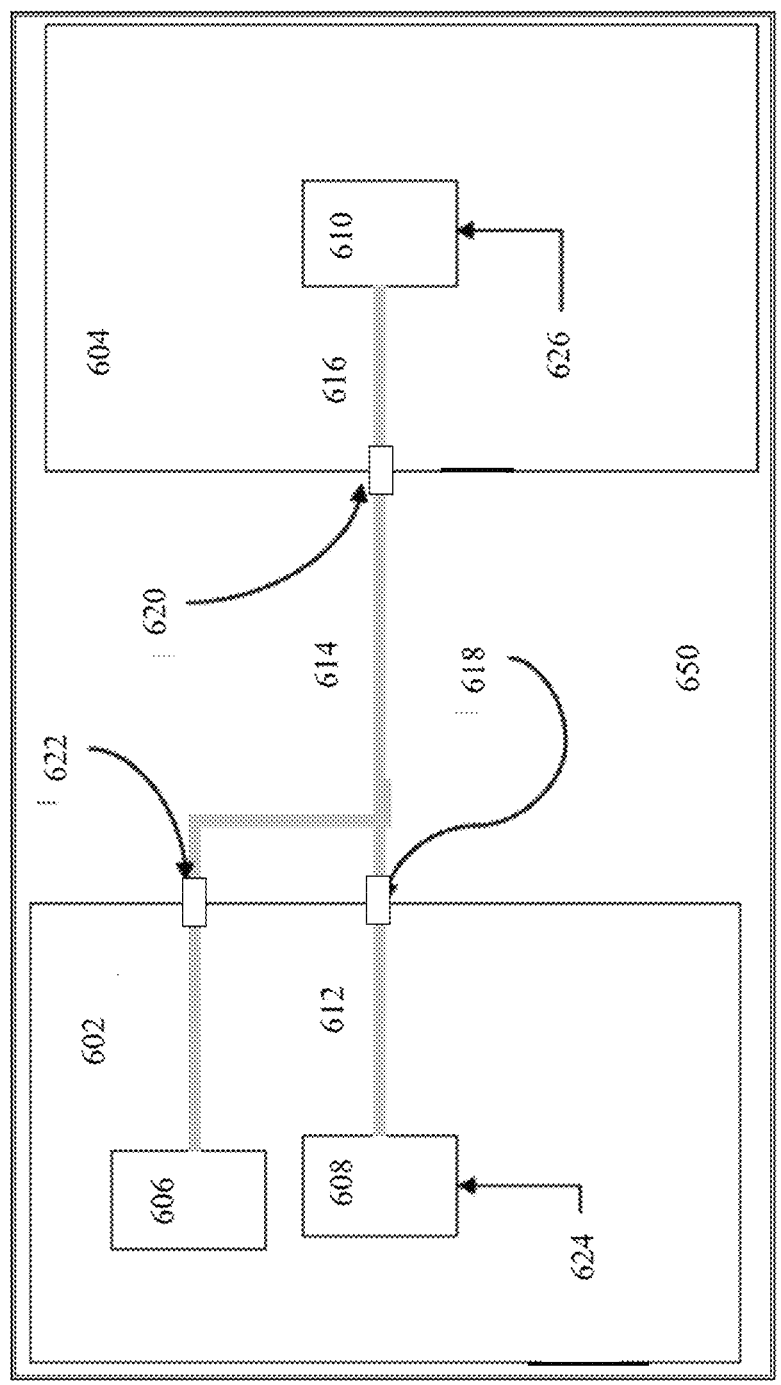
FIG. 6 illustrates an exemplary hierarchical design in some embodiments.

FIG. 6 illustrates an exemplary hierarchical design in some embodiments. The exemplary hierarchical design includes two blocks 602 and 604. The first block 602 includes two sub-blocks 606 and 608, such as but not limited to flip-flops, and two output pins 622, which may be designated as P_OUT2, and 618, which may be designated as P_OUT The sub-block 608 receives the first clock signal 624, which may be designated as CLK1. The second block 604 includes one sub-block 610, which receives the second clock signal 626, which may be designated as CLK1, and an input pin 620, which may be designated as P_IN. The first block 602 and the second block 604 are interconnected with two paths—the first path goes through 618 and 620, and the second path goes through 622 and 620. In the exemplary hierarchical design shown in FIG. 6, the first path includes three segments—612 between 608 and 618, 614 between 618 and 620, and 616 between 620 and 610. In some embodiments, the synchronous hierarchical implementation may include some post budget constraints for a path such as the first path illustrated in FIG. 6. For example, the synchronous hierarchical implementation may include the following constraints for the first block 602:

set_output_delay *X*1–clock CLK2 [get_ports {*P*_OUT1}]

set_output_delay *X*2–clock CLK2 [get_ports {*P*_OUT2}]

The synchronous hierarchical implementation may include the following constraints for the first block 604:

set_input_delay *Y*–*clock CLK*1 [get_ports {*P*_IN}]

In the aforementioned exemplary constraints, X1 and X2 denote the budget values for P_OUT1 (designated as P_OUT in the constraints) and 622 (designated as P_OUT2 in the constraints), and Y denotes the budget value for 620 (designated as P_IN in the constraints). In some embodiments, the budget value for a negative slack path may be based on the required time, which represents the latest time at which a signal can arrive without making the clock cycle longer than desired, and the ration of segment delay to the total delay. In these embodiments, the budget values of X1 and Y may be expressed as the following:

$X1 = (\text{Required Time}) \times (614+616)/(612+614+616)$, and $Y = (\text{Required Time}) \times (612+614)/(612+614+616)$ In this exemplary hierarchical circuit design illustrated in FIG. 6, the first block 602 and the second block 604 are connected by the top level (650) path segment 614. In a conventional asynchronous hierarchical implementation using a reassembly flow, the path segment 614 will not be considered until the reassembly process that assembles individual block implementations (e.g., 602 and 604) into the top level 650. In some embodiments, the synchronous hierarchical implementation may provide queries whose results or result sets may be used in timing analyses or timing closure.

For example, the synchronous hierarchical implementation may provide a top level path segment query that may be used to obtain the top level segment delays to characterize the top level segment delays on the "from" and "to" points in the top level segment (e.g., 614) or the "from" and "to" clocks of the top level segment. In some embodiments, the results or the result sets in response to a top level path segment query may be stored as follows:

| QUERY | | | | DATA | |
|---|---|---|---|---|---|
| From Block & Port Pair | To Block & Port Pair | From Clock | To Clock | Budgets Early Late Rise Fall | |
| Block1  P_OUT1 | Block2  P_IN | CLK1 | CLK2 | Early Rise Late Rise | Early Fall Late Fall |

The synchronous hierarchical implementation may also provide a block port budget query that may be used to obtain the budget value(s) on a block's port(s), given the clock. In the above embodiments for the exemplary hierarchical design shown in FIG. 6, the results or the result sets in response to a block port budget query may be stored as follows:

| QUERY | | DATA Budgets Early Late |
|---|---|---|
| Block & Port Pair | Reference Clock | Rise Fall |
| Block1  P_OUT1 | CLK2 | X1 |
| Block1  P_OUT2 | CLK2 | X2 |
| Block2  P_IN | CLK1 | Y |

The synchronous hierarchical implementation may also provide a block port to connected port query. A block port may be connected to one or more other ports. With this block port to connected port query, the synchronous hierarchical implementation may send a collection of pairs of the connected "from" or "to", block port and clock, when queried with a port and reference clock. In the above embodiments for the exemplary hierarchical design shown in FIG. 6, the results or the result sets in response to a block port to connected port query may be stored as follows:

| QUERY Block Port & Reference Clock Pair | | | DATA Connected Block Port & Reference Clock Collection | | |
|---|---|---|---|---|---|
| Block1 | P_OUT1 | CLK2 | Block2 | P_IN | CLK1 |
| Block2 | P_IN | CLK1 | Block1 | P_OUT2 | CLK2 |
| | | | Block1 | P_OUT1 | CLK2 |

In some embodiments, a process or system for synchronous hierarchical implementation may be used to perform bottom-up hierarchical constraint checking with one or more types of queries provided above. For example, the process may check and flag inconsistency of the interface path constraints from block level to the chip level by using one or more of the queries provided above against information that is stored in an exemplary format as follows:

| QUERY Block Port & Reference Clock Pair | | | DATA No. of Cycles |
|---|---|---|---|
| Block1 | P_OUT | CLK2 | 1 |
| Block2 | P_IN | CLK1 | 1 |

In some cases, a change in the number of cycles for a block port and reference clock pair may flat a constraint inconsistency if there are other connected ports that may be affected by such a change. The method or system for synchronous hierarchical implementation may use the queries provided above to obtain the desired results.

In some embodiments, a process or system for synchronous hierarchical implementation may be version controlled by tracking changes made to timing information. The process or system for synchronous hierarchical implementation may thus leverage the latest timing information within as well as across the blocks. In some embodiments, the version control module (e.g., 108 in FIG. 1) of the method or system logs all user and system operations that actually change or attempt to change the hierarchical electronic design.

Figure 7:
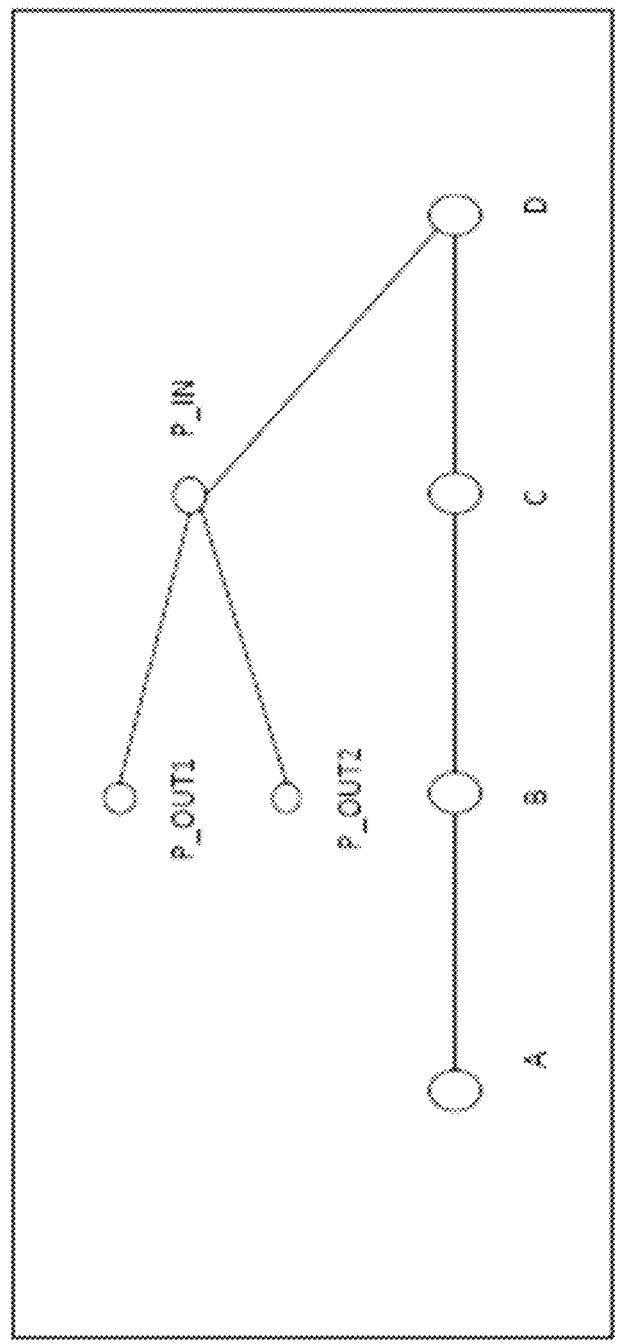
FIG. 7 illustrates an exemplary design connectivity model for the exemplary hierarchical design of FIG. 6 in some embodiments.

FIG. 7 illustrates an exemplary design connectivity model for the exemplary hierarchical design of FIG. 6 in some embodiments. As it can be seen in the example illustrated in FIG. 7, connectivity may be model on each block port. With a design connectivity model such as the exemplary model shown in FIG. 7, any change in an attribute at a block port may thus be propagated along all the connected ports by using the design connectivity model.

Figure 8:
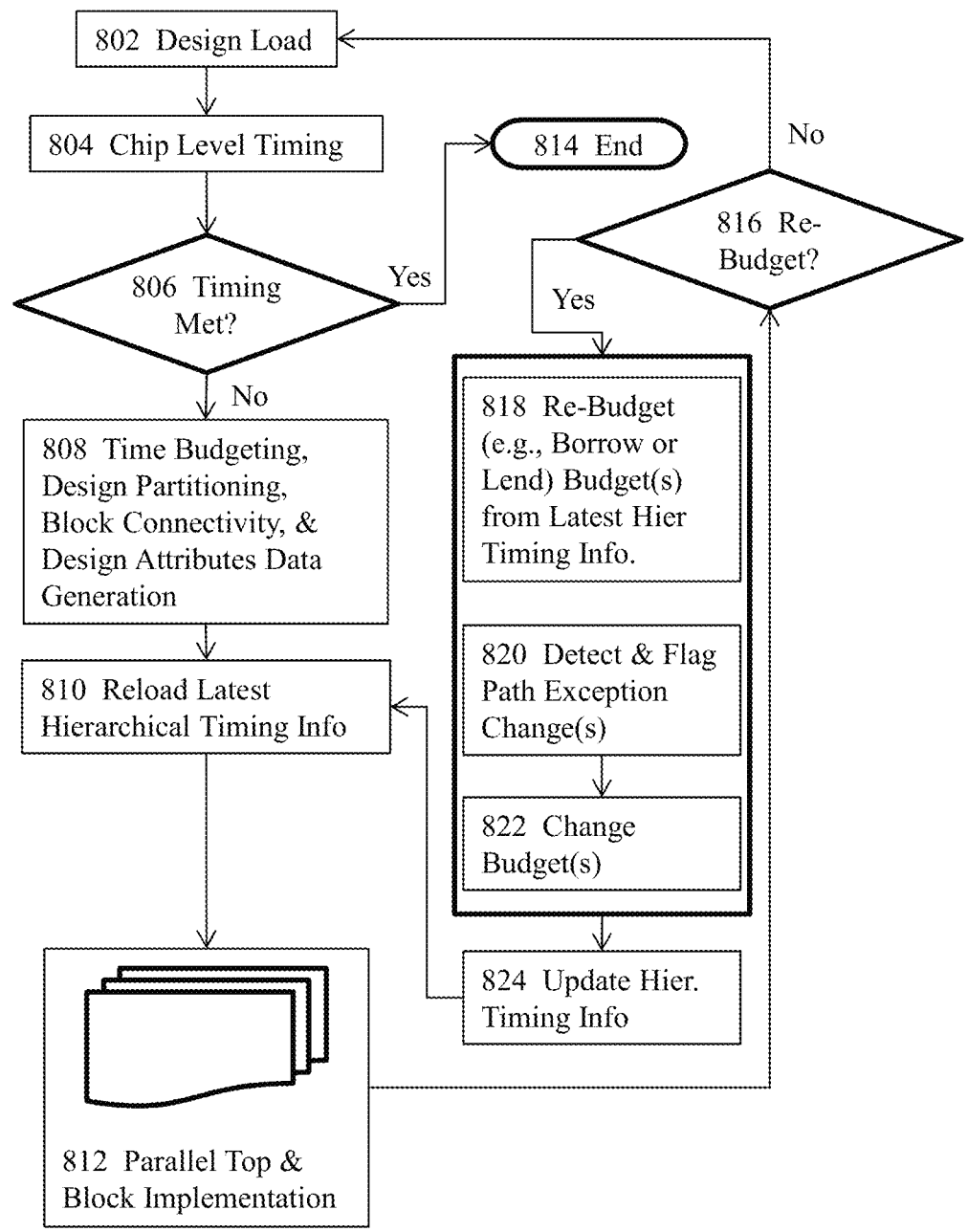
FIG. 8 illustrates a high level flow diagram of a synchronous hierarchical implementation of electronic circuit designs in some embodiments.

FIG. 8 illustrates a high level flow diagram of a synchronous hierarchical implementation of electronic circuit designs in some embodiments. In one or more embodiments, the method for synchronous hierarchical implementation of hierarchical electronic circuit designs may comprise the process 802 of loading the design. In some embodiments, the method may further comprise the process 804 of performing top level (e.g., chip level) timing analyses or timing closure. At 806, the method may determine whether or not the timing goals or timing closure is achieved in some embodiments. In some embodiments where the method determines that the timing goals or timing closure has already been achieved, the method may proceed to 814 to close timing for the electronic design under consideration. In some embodiments where the method determines that the timing goals or timing closure has not been properly achieved at 806, the method may further comprise the process 808 of partitioning the hierarchical electronic design into multiple partitions, each of which includes zero or more blocks, and performing time budgeting for the multiple partitions.

The method may then store the data or information generated or updated at 810 into a non-transitory computer readable medium. In some embodiments, the method may update the connectivity and design attribute database 316 with the generated or updated information or data. At 810, the method may comprise the process of loading or reloading the latest hierarchical timing information for a circuit component, a cell, or a block of circuit components at various hierarchical levels in the hierarchical electronic design. In some embodiments, the method may load or reload the latest hierarchical timing information from a data structure such as a connectivity and design attribute database 316. In some embodiments, the hierarchical timing information may include data or information such as, but not limited to, budgets, segment delays, path exceptions, required times, or any changes thereof, etc. In some embodiments, the method may implement the hierarchical electronic design at various hierarchical or granularity levels. In some embodiments, the process performs the top level and block implementation in parallel at 812 so as to reduce the time required for convergence.

For example, the method may then implement the blocks, multiple partitions, or the top level (e.g., chip level) electronic design with the latest hierarchical timing information in some embodiments. In some embodiments, the implementation of the hierarchical electronic design at various hierarchical or granularity levels may be performed in parallel. That is, the implementation of one block of circuits may be performed in parallel with the implementation of the top level hierarchical electronic circuit. Nonetheless, the parallel implementations of the blocks and/or the top level hierarchical electronic design do not necessarily mean that these implementations are independent of each other such that an implementation of one block is completely transparent to another implementation of another block. Rather, an implementation of the hierarchical electronic design at a first granularity or hierarchical level (e.g., the implementation of a first block) is made aware of the implementations of the hierarchical electronic design (e.g., the implementations of the other blocks that are connected to the first block) that may affect or may be affected by the implementation of the first block) with the latest timing information or data loaded or reloaded at 810.

Therefore, the implementations of the hierarchical electronic design are performed synchronously, rather than asynchronously, and the implementation of the hierarchical electronic design at a granularity or hierarchical level (e.g., implementation of a block) is made aware of the other implementations. In some embodiments, an implementation of the hierarchical electronic design at a granularity or hierarchical level may include time budgeting, timing analyses, timing closure, physical implementation of a part of the hierarchical electronic design (e.g., any modifications made to the physical design), any path exceptions, any changes affecting the timing, etc. In some embodiments, the method may further comprise the process 816 of determining whether or not time budgeting needs to be re-performed. In some embodiments where the method determines that re-budgeting is not desired or required at 816, the method may loop back to 802 to reload the hierarchical electronic design and repeats the processes as described above.

In some embodiments where the method determines that re-budgeting is required or desired, the method may further comprise the process 818 of performing time re-budgeting that redistributes time budgets for a block (or a cell, or any other portion of the hierarchical electronic design under consideration). In some embodiments where, for example, the allocated time budget for the block being implemented has been exhausted, the method may borrow from one or more other blocks, cells, portions, or partitions (hereinafter block or blocks) of the hierarchical electronic design that are connected with the block being implemented. In some embodiments where, for example, the allocated time budget for a block that is connected with another block has been exhausted, the method may borrow from this another block that is connected with the block as long as this another block is capable of lending its distributed time budget to other block(s).

It shall be noted that borrowing and lending budgets do not necessarily have to occur for blocks at the same hierarchical levels; rather, the method or system for synchronous hierarchical implementation may borrow or lend budgets across various hierarchies. In some embodiments, the method for synchronous hierarchical implementation of hierarchical electronic circuit designs may comprise the process 820 of detecting or flagging a change (e.g., an addition, a modification, or removal of a path exception) in path exceptions. For example, the method may detect or flag a change that makes a single-cycle path into a multi-cycle path, or vice versa. In some embodiments, the method for synchronous hierarchical implementation of hierarchical electronic circuit designs may comprise the process 822 of changing or modifying the budget(s) according to the change detected or flagged at 820. In some embodiments, the method for synchronous hierarchical implementation of hierarchical electronic circuit designs may comprise the process 824 of updating the hierarchical timing information to reflect the budgets updated at 822 such that the latest timing information is available for, for example, the process 810 that loads or reloads the latest timing information for the hierarchical electronic design.

Figure 9:
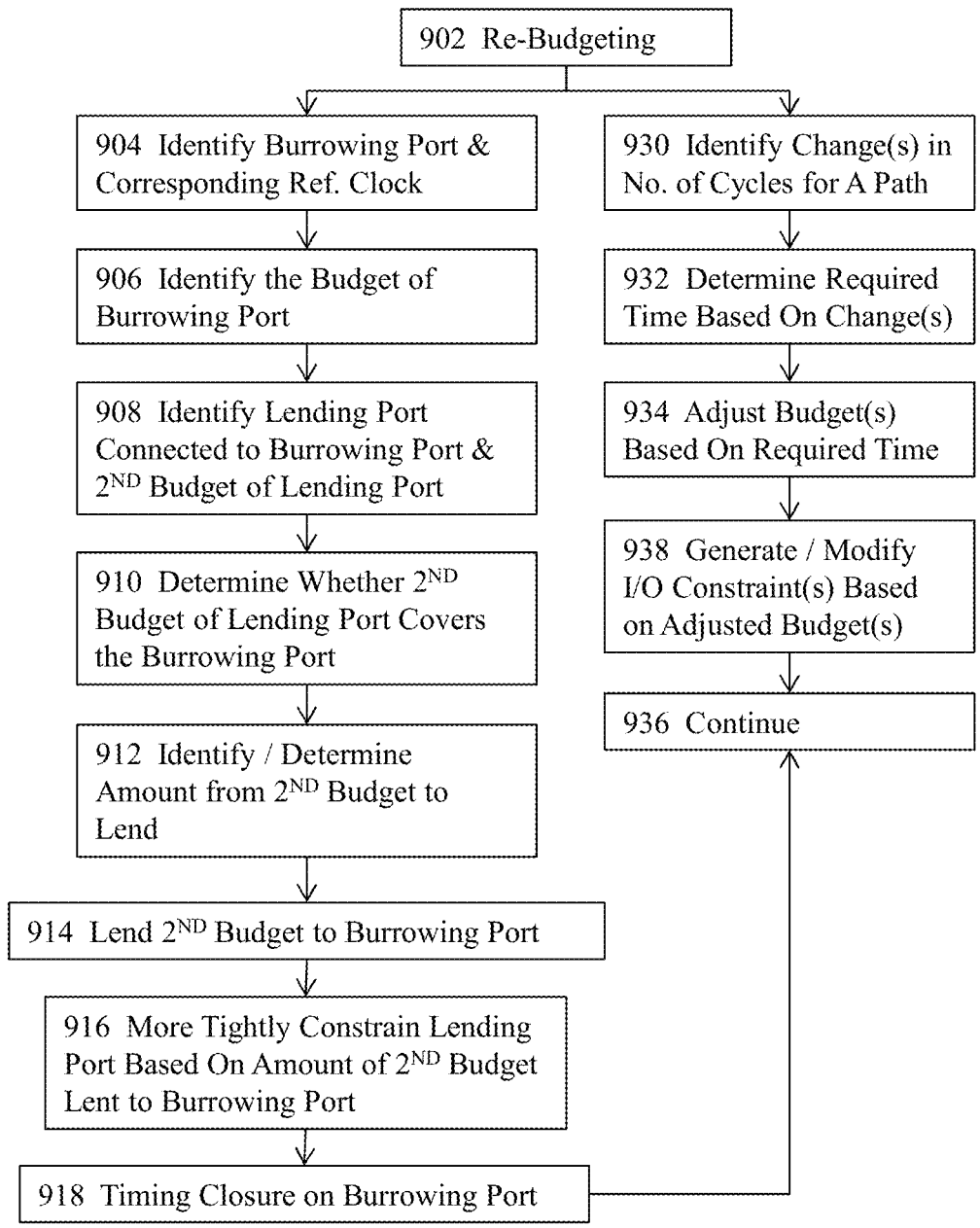
FIG. 9 illustrates more details about a high level flow diagram of an exemplary re-budgeting process or module shown in FIG. 8 in some embodiments.

FIG. 9 illustrates more details about a high level flow diagram of an exemplary re-budgeting process or module shown in FIG. 8 in some embodiments. In some embodiments, the exemplary re-budgeting process or module 902 may comprise the process or module 904 of identifying a borrowing port, which may be required or desired to borrow time budget from one or more other blocks of circuits, and the reference clock for the borrowing port. In some embodiments, the exemplary re-budgeting process or module 902 may comprise the process or module 906 of identifying the first time budget distributed for the borrowing port. In this exemplary re-budgeting process or module, the first time budget distributed for the borrowing port is assumed to have exhausted so no further optimization is possible for the block to which the borrowing port belongs.

In some embodiments, the exemplary re-budgeting process or module 902 may comprise the process or module 908 of identifying a lending port that is connected to the borrowing port and the second time budget distributed for the lending port, which may be lent to the borrowing port. For example, the process or module 902 may identify the lending port and the second time budget distributed for the lending port from the timing database or the connectivity and design attribute database described above in some embodiments. In some embodiments, the exemplary re-budgeting process or module 902 may comprise the process or module 910 of determining whether the second time budget may be used to cover the exhausted time budget distributed for the borrowing port. In some embodiments where it is determined that the second time budget is insufficient to cover the exhausted first time budget, the process or module 902 may identify an additional lending port that is connected to the borrowing port to lend the third time budget distributed for this additional lending port to cover the exhausted first time budget.

In some embodiments, the exemplary re-budgeting process or module 902 may comprise the process or module 912 of identifying or determining the amount that is to be lent form the second time budget. In some embodiments, the amount that is to be lent from the second time budget may be identified or determined based at least in part upon the first time budget distributed for the borrowing port or upon the requirement of not disturbing results of the timing closure or timing analyses performed on the block to which the lending port belongs. In some embodiments, the amount may be user defined or specified. In some embodiments, the amount may be proposed or recommended by the system to the users. For example, the system of synchronous hierarchical implementation may determine the amount based at least in part upon heuristics or upon the results of the timing closure or timing analyses performed on the lending block or on some other blocks that are similar to the lending block (to which the lending port belongs).

In some embodiments, the exemplary re-budgeting process or module 902 may comprise the process or module 914 of lending a part of the second time budget from the lending port to the borrowing port. In some embodiments, the exemplary re-budgeting process or module 902 may comprise the process or module 916 of further constraining the lending port based at least in part upon the amount of the second time budget that the borrowing port borrows from the lending port. In some embodiments, the exemplary re-budgeting process or module 902 may comprise the process or module 918 of performing timing analyses or timing closure on the block to which the borrowing port belongs until timing closure is properly achieved on the block implementation or no further budgets are possible with the given set of constraints and continue at 936.

In some embodiments where the re-distributed first time budget after borrowing from the lending port is still insufficient to properly close the timing closure for the block to which the borrowing port belongs, the re-budgeting process or module 902 may repeat substantially the same sub-processes as described above until the timing of the block to which the borrowing port belongs is properly closed or until the results of timing analyses are satisfactory or it is not possible to borrow any more budgets with the current set of constraints. In addition or in the alternative, the exemplary re-budgeting process or module 902 may comprise the process or module 930 of identifying one or more changes in the number of cycles for a path. In some embodiments, the path interconnects two blocks (or cells, or any two portions of the hierarchical electronic design under consideration). In some embodiments, the exemplary re-budgeting process or module 902 may comprise the process or module 932 of determining the required time(s) based at least in part upon the one or more changes in the number of cycles identified at 930.

In some embodiments, the process or module 902 may determine the required times according to the one or more changes in the number of cycles of one or more paths by using the connectivity information or data or the timing information or data in, for example, the timing database or the connectivity and design attribute database. In some embodiments, the exemplary re-budgeting process or module 902 may comprise the process or module 934 of adjusting time budget(s) based at least in part upon the required time(s). These sub-processes 930-934 may be used to capture the embodiments where the required times are changed as a results of the one or more changes in the number of cycles (e.g., from a single-cycle path to a multi-cycle path, or vice versa). In these embodiments, the distributed time budgets may have to be adjusted (e.g., inflated or deflated) as a result of the one or more changes in the number of cycles.

In some embodiments, the exemplary re-budgeting process or module 902 may comprise the process or module 938 of generating a new set of I/O or timing constraints or modifying an existing set of I/O or timing constraints based at least in part upon the adjusted time budgets. In some embodiments, the process or module 938 may further load the newly generated or modified I/O or timing constraints to the corresponding parts of the hierarchical electronic design under consideration. In some embodiments, the method or system including the re-budgeting process or module 902 may reduce the number of iterations or completely eliminate the need for the iterative re-assembly process and thus provides safe yet much faster turn-around time without having to assign optimistic or pessimistic time budgets and without having to go through numerous iterations of the re-assembly flow.

In some embodiments, the method or system of synchronous hierarchical implementation may provide a substantially evenly distributed time budgets in different path segments and thus a substantially even distribution of the logic across various blocks in the hierarchical electronic design under consideration. As a result, the method or system of synchronous hierarchical implementation may further provide a substantially even area distribution for the various blocks in the hierarchical electronic design. In some embodiments, the method or system of synchronous hierarchical implementation may also provide a push-button approach for performing timing closure on a hierarchical electronic design because the entire process flow may be automatically performed without human intervention such that time budgets may be automatically adjusted by either budget borrowing or budget lending until the timing of the entire hierarchical electronic design is properly closed or signed off. Another advantage of the method or system of synchronous hierarchical implementation is that the system is version controlled such that a designer or architect may load multiple versions to review or compare these multiple versions or the changes thereof at the same or different hierarchical levels or granularity levels.

Figure 10A:
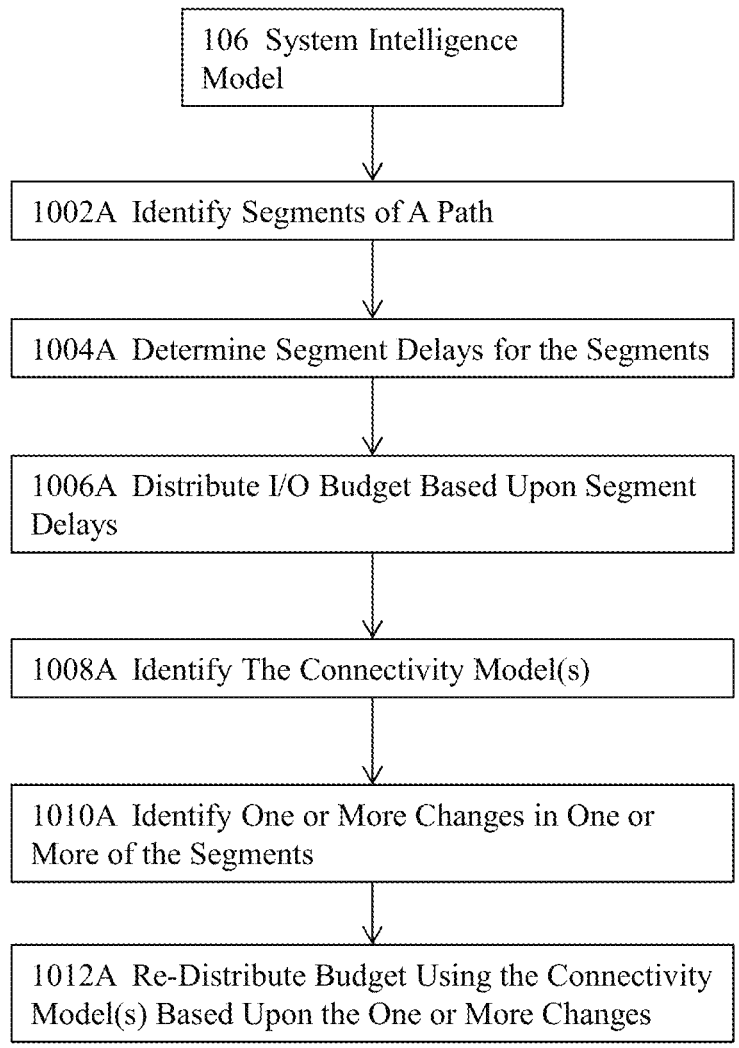
FIG. 10A illustrates more details about a high level flow diagram of an exemplary system intelligence process or model in some embodiments.

FIG. 10A illustrates more details about a high level flow diagram of an exemplary system intelligence process or model in some embodiments. In some embodiments, the exemplary system intelligence process or module 106 may comprise the process or module 1002A of identifying multiple segments of a path. In some embodiments, the path identified at 1002A interconnects two blocks (or two cells or any two portions of the hierarchical electronic design). In some embodiments, the exemplary system intelligence process or module 106 may comprise the process or module 1004A of determining segment delays for each of the multiple segments identified at 1002A. In some embodiments, the exemplary system intelligence process or module 106 may comprise the process or module 1006A of distributing the I/O budget based at least in part upon the segment delays determined at 1004A. In some embodiments, the exemplary system intelligence process or module 106 may comprise the process or module 1008A of identifying a connectivity model for the path under consideration. In some embodiments, the exemplary system intelligence process or module 106 may comprise the process or module 1010A of identifying one or more changes in one or more of the segments that may affect the I/O budget distribution. In some embodiments, the exemplary system intelligence process or module 106 may comprise the process or module 1012A of re-distributing the time budget among the multiple segments by using the connectivity model based at least in part upon the one or more changes identified at 1010A.

Figure 10B:
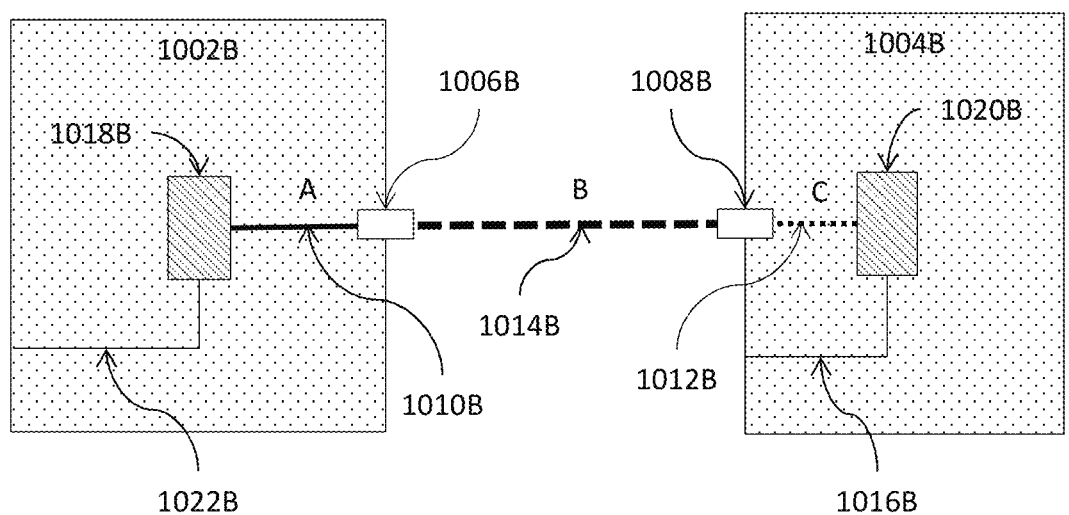
FIG. 10B illustrates an exemplary hierarchical electronic design to provide more details about some of the blocks in FIG. 10A in some embodiments.

FIG. 10B illustrates an exemplary hierarchical electronic design to provide more details about some of the blocks in FIG. 10A in some embodiments. The exemplary hierarchical electronic design includes a first block 1002B and a second block 1004B that are interconnected by a path comprising three segments 1010B (between a first circuit component 1018B and a first output pin 1006B of the first block 1002B), 1014B (between the first output pin 1006B of the first block 1002B and the first input pin 1008B of the second block 1004B), and 1012B (between the second circuit component 1020B and the first input pin 1008B of the second block 1004B). The segment delay of the segment 1010B is denoted as A; the segment delay of the segment 1014B is denoted as B; and the segment delay of the segment 1012B is denoted as C. The first circuit component 1018B is receiving a second clock signal 1022B (CK2), and the second circuit component 1020B is receiving the first clock signal 1016B (CK1). In this exemplary hierarchical electronic design, the serial output data (SOD) and the serial input data (SID) may be expressed as follows:

At the first output pin $1006B$, $\text{SOD}(\text{CK1}) = (B+C)/(A+B+C) \times \text{Quantity}$ At the first input pin $1008B$, $\text{SID}(\text{CK2}) = (A+B)/(A+B+C) \times \text{Quantity}$ During the implementation of the exemplary hierarchical electronic design, a change in the segment may lead to re-alignment of the I/O budgets. In these embodiments, the system intelligence layer or module may use the connectivity model(s) to determine and redistribute the I/O budgets as described above. Another working example of the flow diagram of the exemplary system intelligence process or module 106 is illustrated in FIG. 6 and described in its corresponding text above.

Figure 11A:
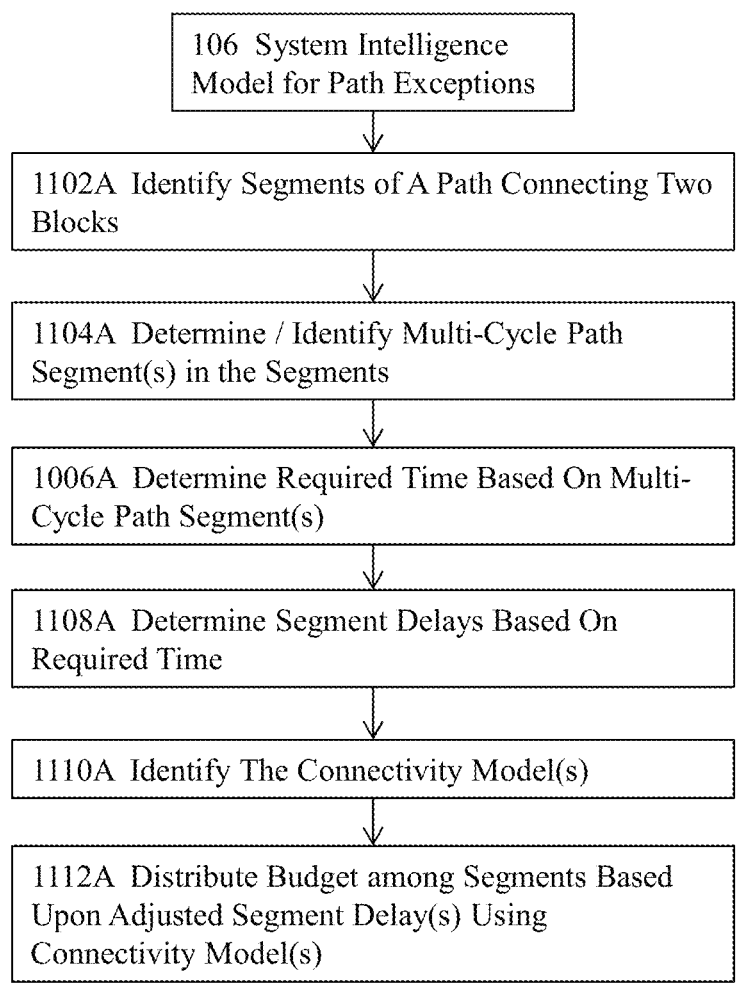
FIG. 11A illustrates a high level flow diagram of an exemplary system intelligence model that accounts for path exceptions in some embodiments.

FIG. 11A illustrates a high level flow diagram of an exemplary system intelligence model that accounts for path exceptions in some embodiments. In some embodiments, the exemplary system intelligence model 106 may comprise the process or module 1102A of identifying multiple segments of a path that interconnects two blocks (or cells, partitions, or any portions of the hierarchical electronic design under consideration). In some embodiments, the exemplary system intelligence model 106 may comprise the process or module 1104A of identifying or determining one or more multi-cycle path segments, which were originally designated as single-cycle paths, in the multiple segments identified at 1102A. In some embodiments, the exemplary system intelligence model 106 may comprise the process or module 1106A of determining or adjusting the required time(s) based at least in part upon the multi-cycle path segments identified or determined at 1104A.

In some embodiments, the exemplary system intelligence model 106 may comprise the process or module 1108A of determining segment delays based on the required time(s) determined at 1106A. In some embodiments, the exemplary system intelligence model 106 may comprise the process or module 1110A of identifying a connectivity model for the path under consideration and the process or module 1112A of distributing (if the I/O time budget has not been distributed) or re-distributing (if the I/O time budget was previously distributed before the identification or determination of the one or more multi-cycle path segments at 1104A) the I/O time budget among the multiple path segments by using the connectivity model for the path based at least in part upon the adjusted segment delays. In this example, the one or more multi-cycle path segments identified or determined at 1106A were previously designated as single-cycle path segments. Changing a single-cycle path segment into a multi-cycle path segment may change the required time, and thus the I/O budgets depending on required times may have to be adjusted accordingly.

In these embodiments, the system intelligence layer or model 106 may use the connectivity model for the path under consideration and apply the one or more multi-cycle path segments through the port(s) along the path and realign the I/O budgets if the I/O budgets depend upon the required time(s). In some embodiments where one or more multi-cycle segments are changed into corresponding one or more single-cycle path segments, the flow in FIG. 11A may also be used to account for the changes in path exceptions.

Figure 11B:
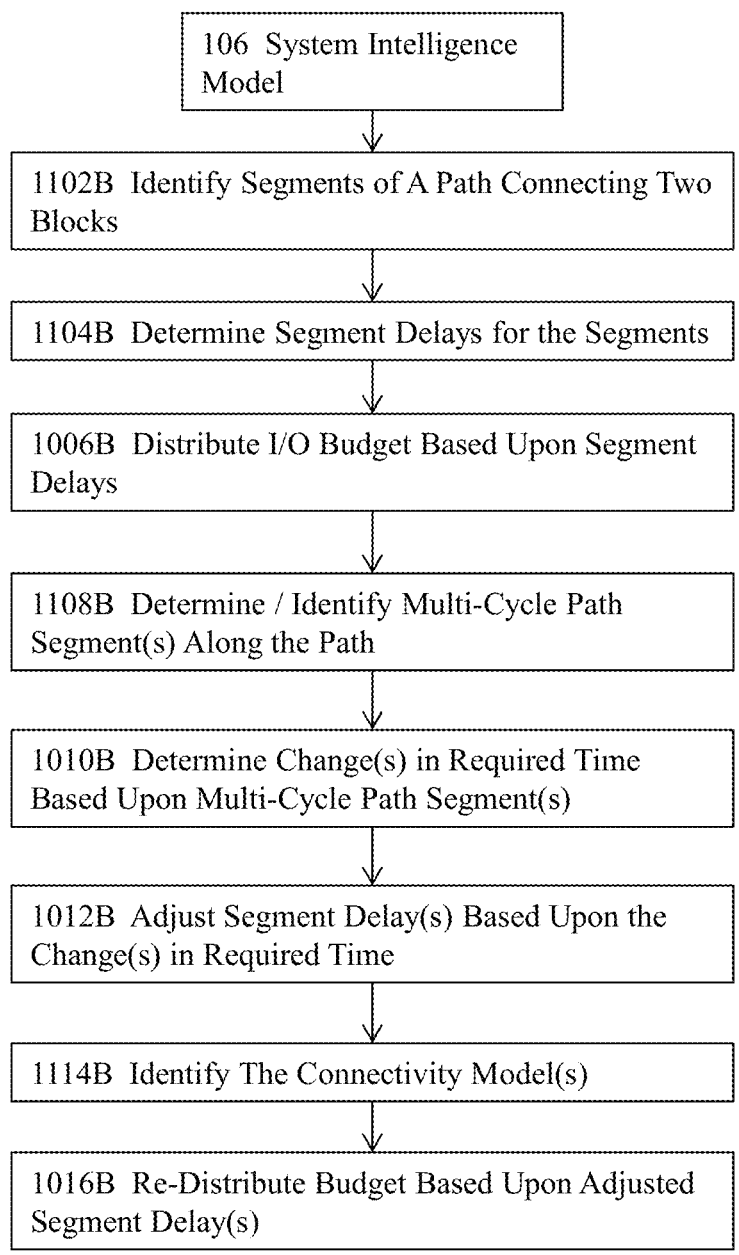
FIG. 11B illustrates a more detailed high level flow diagram of an exemplary system intelligence model that accounts for path exceptions in some embodiments.

FIG. 11B illustrates a more detailed high level flow diagram of an exemplary system intelligence model that accounts for path exceptions in some embodiments. In some embodiments, the exemplary system intelligence model 106 may comprise the process or module 1102B of identifying multiple segments in a path that interconnect two blocks (or cells, partitions, or any portions of the hierarchical electronic design under consideration). In some embodiments, the exemplary system intelligence model 106 may comprise the process or module 1104B of determining segment delays for each segment of the multiple segments identified at 1102B. In some embodiments, the exemplary system intelligence model 106 may comprise the process or module 1106B of distributing the I/O time budgets based at least in part upon the segment delays determined at 1104B.

In some embodiments, the exemplary system intelligence model 106 may comprise the process or module 1108B of identifying or determining one or more multi-cycle path segments along the path. In some embodiments, the exemplary system intelligence model 106 may comprise the process or module 1110B of determining change(s) in the required time(s) based at least in part the one or more multi-cycle path segments identified or determined at 1108B. In some embodiments, the exemplary system intelligence model 106 may comprise the process or module 1112B of adjusting segment delay(s) based at least in part upon the change(s) in the required time(s). In some embodiments, the exemplary system intelligence model 106 may comprise the process or module 1114B of identifying a connectivity model for the path under consideration. In some embodiments, the exemplary system intelligence model 106 may comprise the process or module 1116B of re-distributing the I/O budget based at least in part upon the adjusted segment delay(s). Also a change in path exception is to be propagated to other blocks.

Figure 11C:
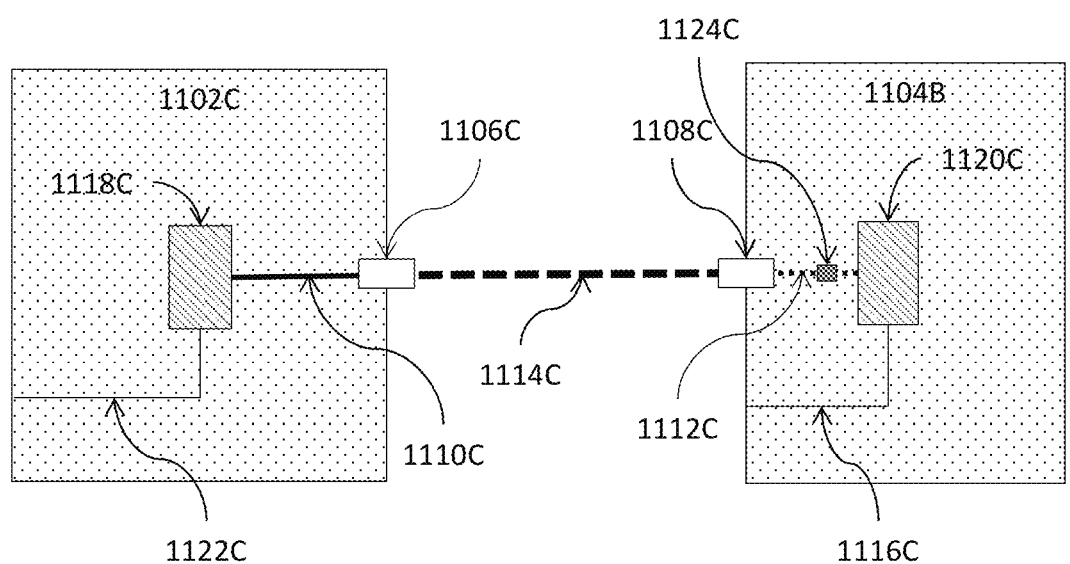
FIG. 11C illustrates an exemplary hierarchical electronic design to provide more details about some of the blocks in FIGS. 11A-B in some embodiments.

FIG. 11C illustrates an exemplary hierarchical electronic design to provide more details about some of the blocks in FIGS. 11A-B in some embodiments. More particularly, FIG. 11C illustrates two blocks 1102C, which includes a first circuit component 1118C (e.g., a first flip-flop) and a first output port 1106C, and 1104C and receiving a second clock signal 1122C (CLK2), which includes a second circuit component 1120C (e.g., a second flip-flop) and a first input port 1108C and receives a first clock signal 1116C (CLK1). The first block 1102C and the second block 1104C are interconnected with a path including the segments 1110C, 1114C, and 1112C as shown in FIG. 11C. If a multiple-cycle path exception is introduced at 1124C, the system intelligence layer or module of the system of synchronous hierarchical implementation may use the connectivity model and apply the multi-cycle path exception through the first output port 1106C and realign the I/O budgets based on the multi-cycle path exception in case the I/O budgets depend on the required time(s).

In some embodiments, the method or system may further comprise, but not limited to, a power budgeting module 116 that may be used to reduce voltage (IR) drop or leakage power by deducing power budgets for each block (or cell or portion) of a hierarchical design and redistribute the power with the connectivity information, connectivity model(s), design attribute(s), and/or the system intelligence layer or module in a substantially similar manner as previously described for the I/O budget analyses and redistribution. In some embodiments, the method or system may further comprise a user interface 114 for design administration, where a super user for an electronic design may have all the rights to all approvals. In some embodiments, the method or system may further comprise a user interface 114 for block implementation management, where one or more administrators at the same or different approval hierarchies for a block may initiate and approve attribute-based requests such as a request for a change to be made to one or more attributes of the block. In some embodiments, the method or system may further comprise a user interface 114 for managing the top level implementation, where one or more administrators at the same or different approval hierarchies may initiate and approve top level implementation attribute requests such as a change to be made to one or more attributes at the top level. In some embodiments, the method or system may further comprise a user interface 114 for a designer to check in and out the electronic design or to validate certain design, functional, or other aspects of the electronic design. In these embodiments, the user interface may be role-based to provide different functionalities to different users based on the roles of the users. In some embodiments, the complete workflow for hierarchical design closure is built into the user interface, which may be extensible by users.

System Architecture Overview

Figure 12:
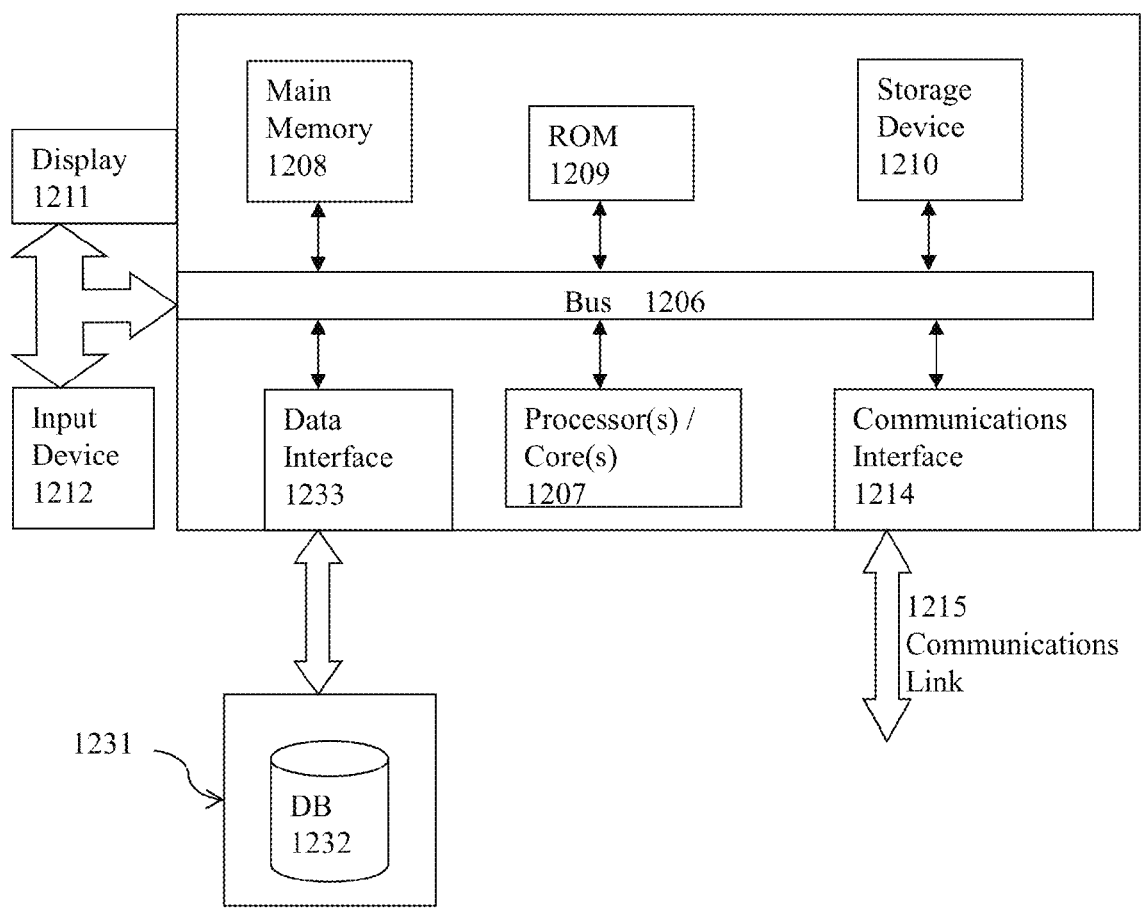
FIG. 12 illustrates a computerized system on which a method for synchronous hierarchical implementation of electronic circuit designs may be implemented.

FIG. 12 illustrates a block diagram of an illustrative computing system 1200 suitable for implementing a physical electronic circuit design with multiple-patterning techniques as described in the preceding paragraphs with reference to various figures. Computer system 1200 includes a bus 1206 or other communication mechanism for communicating information, which interconnects subsystems and devices, such as processor 1207, system memory 1208 (e.g., RAM), static storage device 1209 (e.g., ROM), disk drive 1210 (e.g., magnetic or optical), communication interface 1214 (e.g., modem or Ethernet card), display 1211 (e.g., CRT or LCD), input device 1212 (e.g., keyboard), and cursor control (not shown).

According to one embodiment, computer system 1200 performs specific operations by one or more processor or processor cores 1207 executing one or more sequences of one or more instructions contained in system memory 1208. Such instructions may be read into system memory 1208 from another computer readable/usable storage medium, such as static storage device 1209 or disk drive 1210. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1207, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 1207 for execution. Such a medium may take many forms, including but not limited to, non-volatile media and volatile media. Non-volatile media includes, for example, optical or magnetic disks, such as disk drive 1210. Volatile media includes dynamic memory, such as system memory 1208.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1200. According to other embodiments of the invention, two or more computer systems 1200 coupled by communication link 1215 (e.g., LAN, PTSN, or wireless network) may perform the sequence of instructions required to practice the invention in coordination with one another.

Computer system 1200 may transmit and receive messages, data, and instructions, including program, i.e., application code, through communication link 1215 and communication interface 1214. Received program code may be executed by processor 1207 as it is received, and/or stored in disk drive 1210, or other non-volatile storage for later execution. In an embodiment, the computer system 1200 operates in conjunction with a data storage system 1231, e.g., a data storage system 1231 that contains a database 1232 that is readily accessible by the computer system 1200. The computer system 1200 communicates with the data storage system 1231 through a data interface 1233. A data interface 1233, which is coupled to the bus 1206, transmits and receives electrical, electromagnetic or optical signals that include data streams representing various types of signal information, e.g., instructions, messages and data. In embodiments of the invention, the functions of the data interface 1233 may be performed by the communication interface 1214.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for synchronous hierarchical implementation, comprising:
using at least one processor or at least one processor core to perform a process the process comprising:
identifying a hierarchical electronic design comprising at least a higher hierarchical level that includes at least a first block;
determining whether the higher hierarchical level of the hierarchical electronic design meets an objective based at least in part upon a budgeting result;
implementing the higher hierarchical level and the first block of the hierarchical electronic design; and
determining whether or not re-budgeting is to be performed by using at least a system intelligence layer to lend a portion of a first budget distributed for the first block to a second block.

2. The computer implemented method of claim 1, wherein the act of implementing the higher hierarchical level and the first block of the hierarchical electronic design comprises:
partitioning the higher hierarchical level of the hierarchical electronic design into multiple partitions.

3. The computer implemented method of claim 2, the act of implementing the higher hierarchical level and the first block of the hierarchical electronic design further comprising at least one of:
generating one or more first design attributes for the connectivity and attribute model for at least one partition of the multiple partitions based at least in part upon a result of the budgeting; and
modifying one or more preexisting design attributes in the connectivity and attribute model.

4. The computer implemented method of claim 2, the act of determining whether or not re-budgeting is to be performed further comprising:
identifying the first budget distributed to the first block;
identifying the second block and a second budget distributed to the second block, wherein the second block is situated at a same or different hierarchical level than the first block; and
lending the portion of the first budget to the second block to update the second budget based at least in part upon the portion of the first budget by using the system intelligence layer based at least in part upon a value of a design attribute.

5. The computer implemented method of claim 2, the act of determining whether or not re-budgeting is to be performed further comprising:
adding one or more additional constraints or modifying one or more existing constraints for the first block; and
determining whether or not the second block meets a respective objective that corresponds to the objective.

6. The computer implemented method of claim 1, wherein the act of determining whether or not re-budgeting is to be performed comprises:
identifying a change in a path exception in the hierarchical electronic design by using at least the system intelligence layer; and
determining whether or not the change in the path exception affects one or more required times by using at least the system intelligence layer.

7. The computer implemented method of claim 6, wherein the act of determining whether or not re-budgeting is to be performed further comprises:
identifying a required time that is affected by the change in the path exception;
adjusting the required time based at least in part upon the change in the path exception; and
redistributing one or more budgets based at least in part upon the required time that is adjusted.

8. The computer implemented method of claim 7, wherein process further comprises:
revising one or more design attributes based at least in part upon the one or more budgets that are redistributed; and
loading the one or more design attributes, which are revised, for implementing the higher hierarchical level and the first block of the hierarchical electronic design.

9. The computer implemented method of claim 8, wherein process further comprises:
   performing closure for the higher hierarchical level based at least in part upon the one or more design attributes that are revised.

10. The computer implemented method of claim 1, the process further comprising:
   performing the re-budgeting by using at least the system intelligence layer.

11. The computer implemented method of claim 10, the process further comprising:
   identifying a borrowing port and a first budget of the borrowing port;
   identifying a lending port that is operatively connected to the borrowing port and the second budget of the lending port; and
   lending at least a part of the second budget of the lending port to the borrowing port.

12. The computer implemented method of claim 11, the process further comprising:
   identifying or determining an amount from the second budget of the lending port; and
   identifying one or more constraints that are not yet imposed on the lending port based at least in part upon a result of lending the at least a part of the second budget to the borrowing port.

13. The computer implemented method of claim 11, the process further comprising at least one of:
   performing timing closure on the borrowing port;
   adjusting the first budget or the second budget based at least in part upon one or more factors; and
   generating a constraint or modifying an existing constraint based at least in part upon a result of adjusting the first budget or the second budget.

14. An article of manufacture comprising a non-transitory computer accessible storage medium having stored thereupon a sequence of instructions which, when executed by at least one processor or at least one processor core executing one or more threads, causes the at least one processor or the at least one processor core to perform a method for synchronous hierarchical implementation, the method comprising:
   using at least one processor or at least one processor core to perform a process the process comprising:
   identifying a hierarchical electronic design comprising at least a higher hierarchical level that includes at least a first block;
   determining whether the higher hierarchical level of the hierarchical electronic design meets an objective based at least in part upon a budgeting result;
   implementing the higher hierarchical level and the first block of the hierarchical electronic design; and
   determining whether or not re-budgeting is to be performed by using at least a system intelligence layer to lend a portion of a first budget distributed for the first block to a second block.

15. The article of manufacture of claim 14, wherein the act of implementing the higher hierarchical level and the first block of the hierarchical electronic design comprises:
   partitioning the higher hierarchical level of the hierarchical electronic design into multiple partitions;
   generating one or more first design attributes for the connectivity and attribute model for at least one partition of the multiple partitions based at least in part upon a result of the budgeting; and
   modifying one or more preexisting design attributes in the connectivity and attribute model.

16. The article of manufacture of claim 14, the act of determining whether or not re-budgeting is to be performed further comprising:
   identifying the first budget distributed to the first block;
   identifying the second block and a second budget distributed to the second block, wherein the second block is situated at a same or different hierarchical level than the first block; and
   lending the portion of the first budget to the second block to update the second budget based at least in part upon the portion of the first budget by using the system intelligence layer based at least in part upon a value of a design attribute.

17. The article of manufacture of claim 14, the act of determining whether or not re-budgeting is to be performed further comprising:
   adding one or more additional constraints or modifying one or more existing constraints for the first block; and
   determining whether or not the second block meets a respective objective that corresponds to the objective.

18. The article of manufacture of claim 14, wherein the act of determining whether or not re-budgeting is to be performed comprises:
   identifying a change in a path exception in the hierarchical electronic design by using at least the system intelligence layer;
   determining whether or not the change in the path exception affects one or more required times by using at least the system intelligence layer;
   identifying a required time that is affected by the change in the path exception;
   adjusting the required time based at least in part upon the change in the path exception; and
   redistributing one or more budgets based at least in part upon the required time that is adjusted.

19. The article of manufacture of claim 18, wherein process further comprises:
   revising one or more design attributes based at least in part upon the one or more budgets that are redistributed;
   loading the one or more design attributes, which are revised, for implementing the higher hierarchical level and the first block of the hierarchical electronic design; and
   performing closure for the higher hierarchical level based at least in part upon the one or more design attributes that are revised.

20. The article of manufacture of claim 14, the process further comprising:
   performing the re-budgeting by using at least the system intelligence layer;
   identifying a borrowing port and a first budget of the borrowing port;
   identifying a lending port that is operatively connected to the borrowing port and the second budget of the lending port; and
   lending at least a part of the second budget of the lending port to the borrowing port.

21. The article of manufacture of claim 20, the process further comprising:
   identifying or determining an amount from the second budget of the lending port; and
   identifying one or more constraints that are not yet imposed on the lending port based at least in part upon a result of lending the at least a part of the second budget to the borrowing port.

22. The article of manufacture of claim 20, the process further comprising at least one of:
    performing timing closure on the borrowing port;
    adjusting the first budget or the second budget based at least in part upon one or more factors; and
    generating a constraint or modifying an existing constraint based at least in part upon a result of adjusting the first budget or the second budget.

23. A system for synchronous hierarchical implementation, comprising:
    at least one processor or at least one processor core to:
    identify a hierarchical electronic design comprising at least a higher hierarchical level that includes at least a first block;
    determine whether the higher hierarchical level of the hierarchical electronic design meets an objective based at least in part upon a budgeting result;
    implement the higher hierarchical level and the first block of the hierarchical electronic design; and
    determine whether or not re-budgeting is to be performed by using at least a system intelligence layer to lend a portion of a first budget distributed for the first block to a second block.

24. The system of claim 23, wherein the at least one processor or at least one processor core that is to implement the higher hierarchical level and the first block of the hierarchical electronic design is further to:
    partition the higher hierarchical level of the hierarchical electronic design into multiple partitions;
    generate one or more first design attributes for the connectivity and attribute model for at least one partition of the multiple partitions based at least in part upon a result of the budgeting; and
    modify one or more preexisting design attributes in the connectivity and attribute model.

25. The system of claim 23, wherein the at least one processor or at least one processor core that is to determine whether or not re-budgeting is to be performed is further to:
    identify the first budget distributed to the first block;
    identify the second block and a second budget distributed to the second block, wherein the second block is situated at a same or different hierarchical level than the first block; and
    lend the portion of the first budget to a second block to update the second budget based at least in part upon the amount of the first budget by using the system intelligence layer based at least in part upon a value of a design attribute.

26. The system of claim 23, wherein the at least one processor or at least one processor core that is to determine whether or not re-budgeting is to be performed is further to:
    add one or more additional constraints or modify one or more existing constraints for the first block; and
    determine whether or not the second block meets a respective objective that corresponds to the objective.

27. The system of claim 23, wherein the at least one processor or at least one processor core that is to determine whether or not re-budgeting is to be performed is further to:
    identify a change in a path exception in the hierarchical electronic design by using at least the system intelligence layer;
    determine whether or not the change in the path exception affects one or more required times by using at least the system intelligence layer;
    identify a required time that is affected by the change in the path exception;
    adjust the required time based at least in part upon the change in the path exception; and
    redistribute one or more budgets based at least in part upon the required time that is adjusted.

28. The system of claim 27, wherein the at least one processor or at least one processor core is further to:
    revise one or more design attributes based at least in part upon the one or more budgets that are redistributed;
    load the one or more design attributes, which are revised, for implementing the higher hierarchical level and the first block of the hierarchical electronic design; and
    perform closure for the higher hierarchical level based at least in part upon the one or more design attributes that are revised.

29. The system of claim 23, further comprising:
    a user interface that is to provide users with different hierarchies of rights to:
        initiate or approve one or more attribute-based requests according to their respective hierarchies of rights;
        check in or check out at least a portion of a design; or
        validate or verify the at least a portion of a design.

30. The system of claim 29, in which the user interface is to present a role-based interface to provide one or more different functionalities based at least in part upon a user's role.

31. The system of claim 29, in which the user interface further comprises a hierarchical design closure module to perform closure for the hierarchical electronic design, wherein the hierarchical design closure module is characterized by being capable of being extended by at least one of the users.

32. The system of claim 23, further comprising:
    a messaging module to route one or more messages related to the hierarchical electronic design among users, in which at least one message of the one or more messages includes an embedded link to provide shared information about the hierarchical electronic design that a sender of the at least one message is to share with the users.

33. The system of claim 23, wherein the at least one processor or at least one processor core is further to execute one or more instructions to:
    perform the re-budgeting by using at least the system intelligence layer;
    identify a borrowing port and a first budget of the borrowing port;
    identify a lending port that is operatively connected to the borrowing port and the second budget of the lending port; and
    lend at least a part of the second budget of the lending port to the borrowing port.

34. The article of manufacture of claim 33, wherein the at least one processor or at least one processor core is further to execute one or more instructions to:
    identify or determine an amount from the second budget of the lending port; and
    identify one or more constraints that are not yet imposed on the lending port based at least in part upon a result of lending the at least a part of the second budget to the borrowing port.

35. The system of claim 33, wherein the at least one processor or at least one processor core is further to execute one or more instructions to:
    perform timing closure on the borrowing port;
    adjust the first budget or the second budget based at least in part upon one or more factors; or generate a constraint or modifying an existing constraint based at least in part upon a result of adjusting the first budget or the second budget.

* * * * *